US012186703B2

(12) United States Patent
Aristizabal Yepes et al.

(10) Patent No.: US 12,186,703 B2
(45) Date of Patent: Jan. 7, 2025

(54) PARTICULATE MATERIAL RETAINING DEVICE AND ATMOSPHERIC ACID GAS NEUTRALIZER AND NEUTRALIZING SUBSTANCE FOR SAID GASES

(71) Applicants: Juan David Aristizabal Yepes, Boston, MA (US); Leandro Contreras Zapata, Boston, MA (US); Manuel Salvador Perez Madrid, Envigado Antioquia (CO)

(72) Inventors: Juan David Aristizabal Yepes, Boston, MA (US); Jimmy Collazos Franco, Medellin Antioquia (CO); Leandro Contreras Zapata, Boston, MA (US); Gina Tatiana Correa, Malden, MA (US); Otoniel Felipe Gomez Palacio, Envigado Antioquia (CO); Milton Cesar Meneses Timana, Medellin Antioquia (CO); Manuel Salvador Perez Madrid, Envigado Antioquia (CO); Mariana Perez Palacio, Envigado Antioquia (CO); Juan Carlos Ramirez Velasquez, Medellin Antioquia (CO)

( * ) Notice: Subject to any disclaimer, the term of this patent is extended or adjusted under 35 U.S.C. 154(b) by 1156 days.

(21) Appl. No.: 16/900,680

(22) Filed: Jun. 12, 2020

(65) Prior Publication Data

US 2021/0008495 A1 Jan. 14, 2021

(51) Int. Cl.
*B01D 53/40* (2006.01)
*B01D 47/00* (2006.01)
(Continued)

(52) U.S. Cl.
CPC ............. *B01D 53/40* (2013.01); *B01D 47/00* (2013.01); *B01D 51/06* (2013.01); *B01D 53/185* (2013.01); *B01D 53/78* (2013.01); *B01D 53/92* (2013.01); *B01D 2258/01* (2013.01); *B01D 2258/0283* (2013.01)

(58) Field of Classification Search
None
See application file for complete search history.

(56) References Cited

U.S. PATENT DOCUMENTS

2005/0072299 A1* 4/2005 Thomas ................. B01D 53/18 96/353

FOREIGN PATENT DOCUMENTS

CN 108714353 A * 10/2018
WO WO-2017105245 A2 * 6/2017 ............. B01D 53/48

OTHER PUBLICATIONS

Liu, T. CN108714353A—translated document (Year: 2018).*

* cited by examiner

*Primary Examiner* — Jelitza M Perez
(74) *Attorney, Agent, or Firm* — Eugenio J. Torres-Oyola; Victor M. Rodriguez-Reyes; Rafael Rodriguez-Muriel

(57) ABSTRACT

The present invention is directed to a novel mechanical device containing a liquid solution recirculating inside the device in the form of programmed oriented movements which achieve to trap the contaminants resulting from carburant combustion processes, such as particulate material, smoke, soot, fly ashes, greenhouse type gases in order to remove them from the air and to achieve its neutralization thus providing a clean air and suitable to be reinserted into the environment and the substance obtained by the device is reinserted into the production chain as a raw material applicable to a plurality of industries.

12 Claims, 21 Drawing Sheets

FRONT VIEW

(51) Int. Cl.

| | |
|---|---|
| ***B01D 51/06*** | (2006.01) |
| ***B01D 53/18*** | (2006.01) |
| ***B01D 53/78*** | (2006.01) |
| ***B01D 53/92*** | (2006.01) |

LEFT SIDE VIEW

SECTION AA

Detail 1

(a)

(b)

FRONT VIEW

PARTICULATE MATERIAL RETAINING DEVICE AND ATMOSPHERIC ACID GAS NEUTRALIZER AND NEUTRALIZING SUBSTANCE FOR SAID GASES

FIELD OF THE INVENTION

The present invention relates to air purification and reducing contaminant emissions such as particulate material and toxic gases, namely greenhouse type acid gases expelled into the environment by internal combustion engines and industrial and domestic chimneys, among others.

BACKGROUND

Several apparatuses and devices for reducing, for instance, the load of carbonic gas and particulate material contamination through valves and tanks interconnected are known in the state of the art, such as the case of patent CN205392118 which discloses a exhaust gas purification device for a reactor, being characterized by comprising exhaust gas inlets connected in series, multiple washing units connected in series, a solid adsorbent adsorption unit and a gas discharge port. The gas depuration unit includes an intermediate storage tank and a gas washing tank which are sequentially arranged. In addition, the upper parts of the protection tanks are respectively provided with an air inlet and outlet and the depuration device comprises a liquid inlet and the equipment comprises valves in the liquid discharge orifice, in the liquid addition orifice and in the liquid discharge orifice.

Also, patent document CN20539159 is known, which discloses an exhaust gas treatment device, wherein the device comprises a depuration tower and an exhaust gas adsorption tank. The depuration tower body is provided with an air inlet and outlet, and further comprises a spray trap separator, a first support grid, which is filled with the filling material and in the upper part of said filling material a spraying tube with a spraying nozzle is disposed. The water outlet and the residual water discharge are arranged close to the bottom of the tower body. The outlet and the overflow port are connected to an exhaust pipe, which, in turn, is connected to an exhaust gas adsorption tank. The exhaust gas treatment device has an exhaustive treatment of gases according to the disclosure in the specification of such anteriority.

On its part, document CN205435289 teaches an exhaust gas purification device, which comprises a physics purifying column and a chemical purification chamber. The physics purifying column surface has a waste gas entry, a maintenance hatch door and a purification additive addition door, and a decontamination chamber below the addition door. This system is connected to a chemical cleaning chamber and said chamber is provided with a purified water inlet, wherein said water inlet is connected to a spray pipe and the chemical cleaning chamber has a series of inclined carrying plates and an alternate chamber with spraying system on top of it with a purified gas outlet in the bottom.

There are also devices employing filters, such as document KR101848790 which teaches a residual treatment device for purifying said residual gas provided from a conduit, using a cleaning liquid, wherein the residual gas treatment apparatus comprises a depurator for purifying residual gas using a cleaning liquid, wherein the depurator has an input port through which residual gas flows, a body having an outlet for it to be discharged and at least one portion of gas treatment filter arranged within the body, which is capable of treating residual gas by using the cleaning liquid along with a plurality of spraying tubes having at least one nozzle to spray the cleaning liquid; and a defroster arranged within the body to catch and eliminate the residual gas moisture.

According to the prior art, it is evident that there is still an unsatisfied need of devices for capturing atmospheric particulate material produced by carburant combustion, which is versatile and can be adapted both in size and configuration of its modules in order to be installed on a large scale or on a small scale, such as, for instance, for an automobile exhaust system, wherein the system comprises a component liquid solution capable of neutralizing toxic gases and to retain all the particulate material, wherein, once the solution is saturated, it can be easily removed from the system and used for other purposes.

BRIEF DESCRIPTION OF THE DRAWINGS

FIG. 7 corresponds to plant and front views of the intermediate plate between elements PMOC and.

DETAILED DESCRIPTION OF THE DRAWINGS

Figure 1:
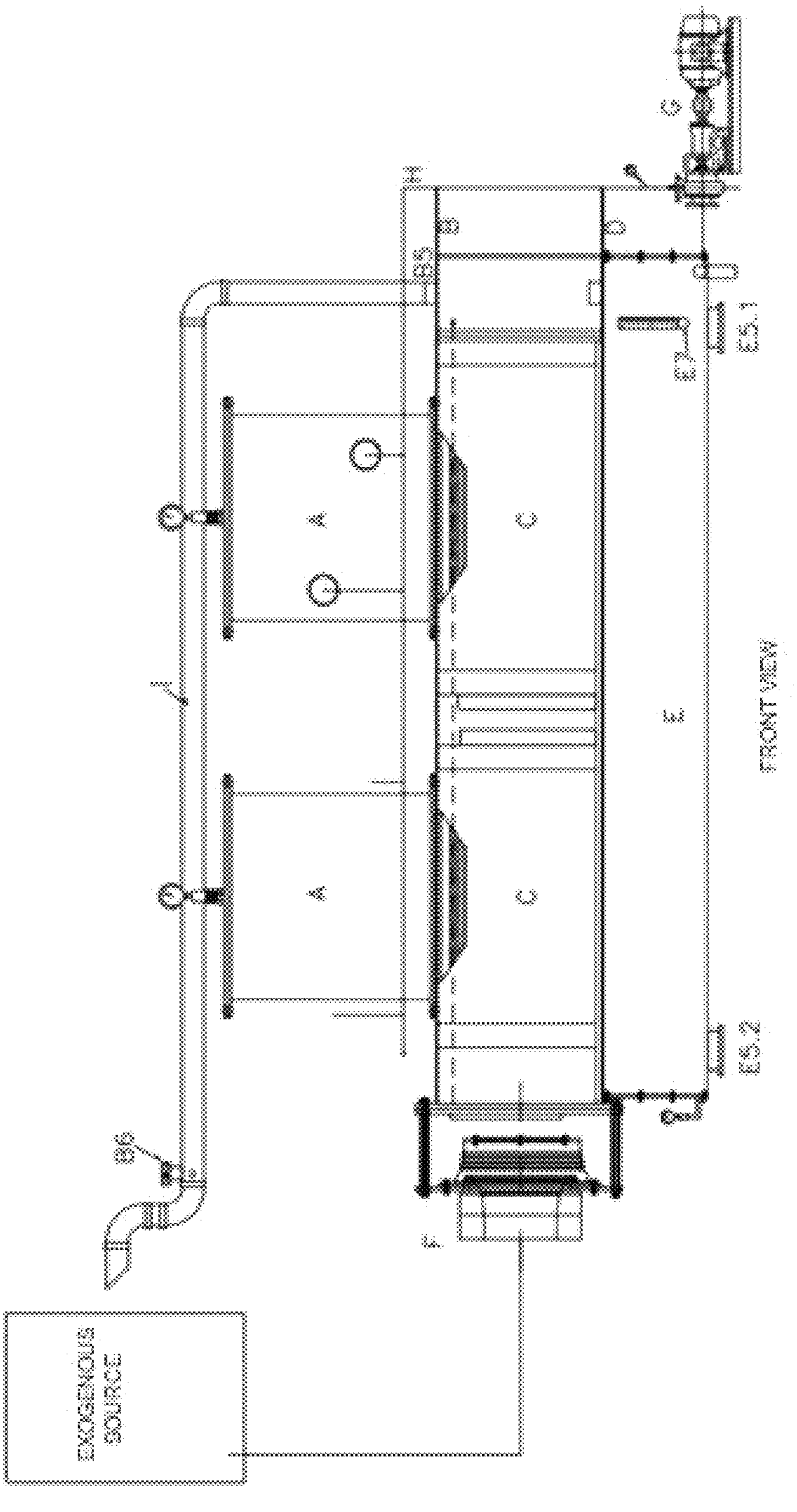
FIG. 1 corresponds to a front view basic/general scheme of the device final assembly according to the invention.

FIG. 1 corresponds to a front view basic/general scheme of the device final assembly according to the invention. In the figure, letter A shows elements called PMOC (programmed movement oriented cylinders) (A); letter C shows the so-called CTT (capture and transformation tank) (C); letter B shows the intermediate plate between OPMC and CTT; letter E shows the element BSST (basic substance storage tank) (E); letter D indicates the intermediate plate between the capture and transformation tank (CTT) (C) and the basic substance storage plate (BSST) (E); letter G shows the substance distribution centrifugal pump; letter H indicates the basic substance conduction ducts; letter I shows the previously de-particularized-decontaminated gas outlet greater duct; letter F shows the direct and/or indirect polluting sources assembly mechanical system with capture and transformation system CTT (C).

Figure 2:
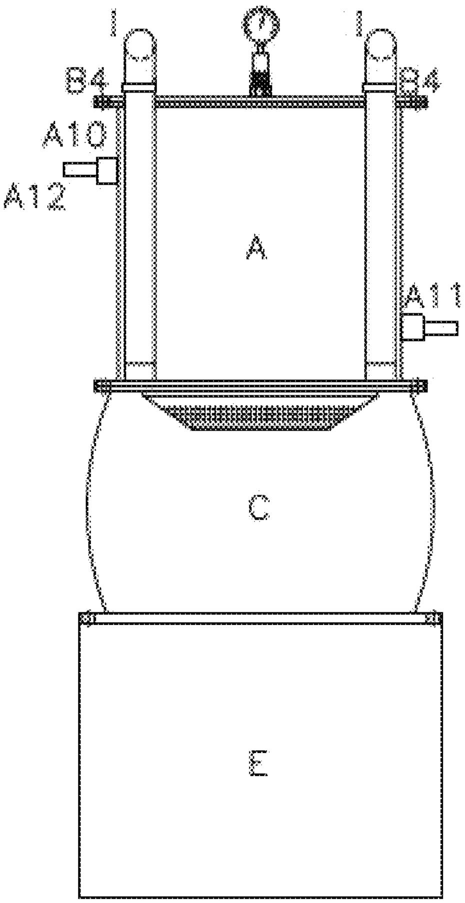
FIG. 2 shows a right-hand side view of the device final assembly.

FIG. 2 shows a right-hand side view of the device final assembly.

Figure 2A:
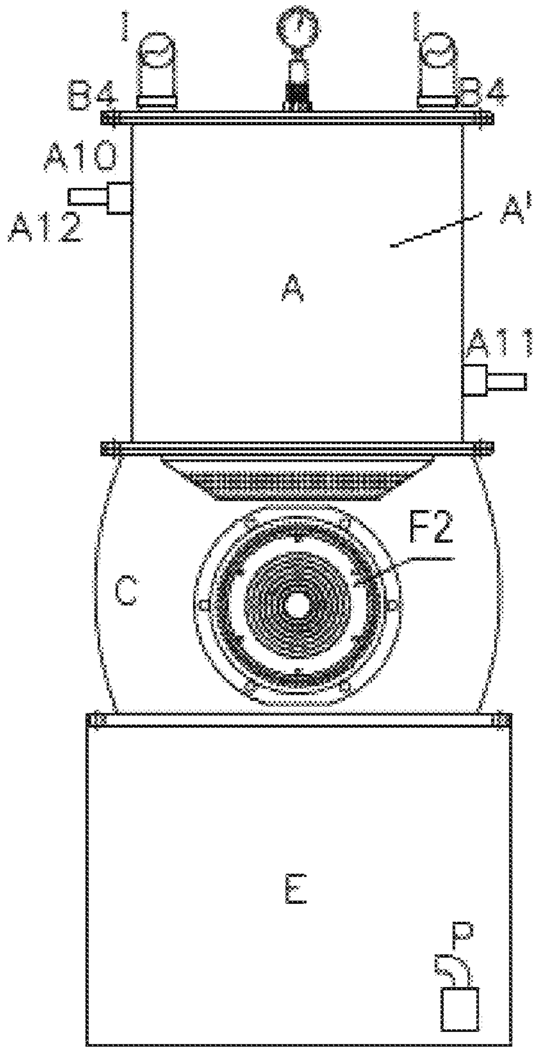
FIG. 2A corresponds to a left-hand side view of the device final assembly.

FIG. 2A corresponding to a left-hand side view, shows an embodiment of the invention wherein the device has only one inlet (F2) of pollution direct source assembly mechanical system (F).

Figure 2B:
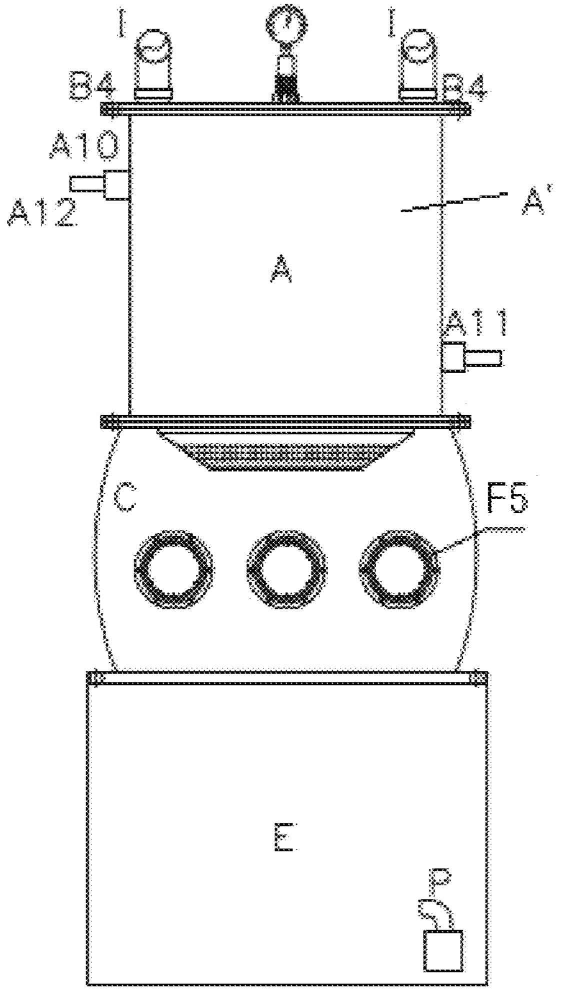
FIG. 2B corresponds to a left-hand side view of the device final assembly.

FIG. 2B also corresponding to a left-hand side view, shows another alternate embodiment of the device of the invention, wherein the device has multiple inlets (F5) in its pollution direct source assembly mechanical system (F).

The right-hand side view in the top surface has an assembly system for fixing ducts marked with letter I, its function is the evacuation of the clean gaseous element, coming from the CTT (C) outlet, FIG. 2A corresponds to an assembly for direct source with only one inlet (F1) in element C. FIG. 2B corresponds to an assembly for indirect source with multiple inlets (F5). This figure shows the following elements: Letter A corresponds to PMOC (programmed movement oriented cylinders); Letter (A10) corresponds to the input or input coupling for basic substance in the top chamber of the cylinder; letter (A11) corresponds to the input or input coupling for basic substance in the lower chamber of the cylinder; letter (C) corresponds to CTT (capture and transformation tank); letter (E) corresponds to BSST (basic substance storage tank); letter (P) defined in the right-hand side views 1-2 corresponds to the basic substance outlet as its recirculation is programmed.

Figure 3:
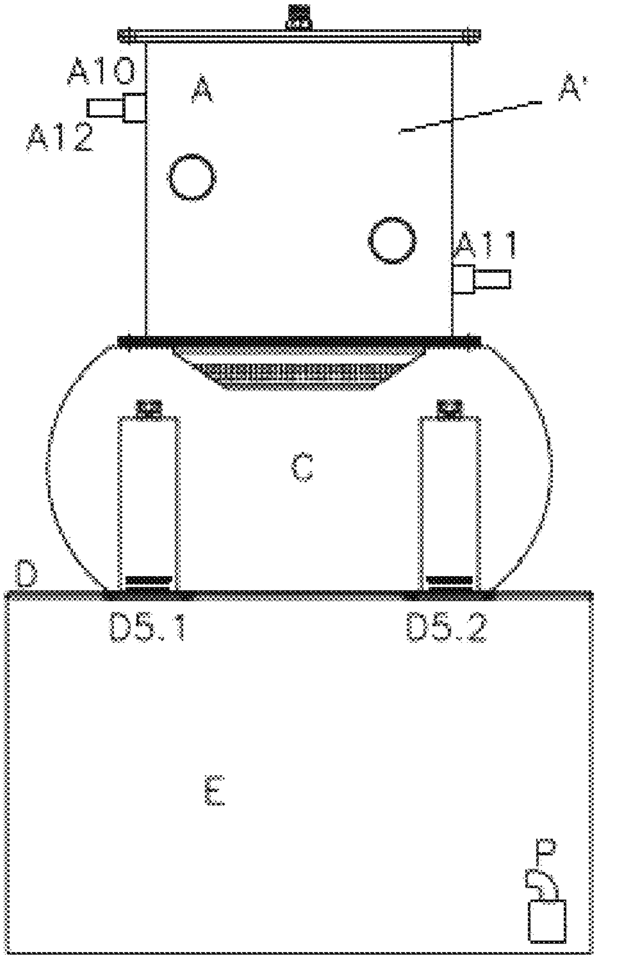
FIG. 3 shows a right-hand side view in longitudinal section in element CTT (capture and transformation tank) where the device final spiracles are shown, the device is shown in complete assembly.
Figure 3A:
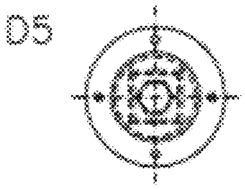
FIGS. 3A, 3B and 3C respectively show top, front and bottom views of the device final spiracles located inside the capture and transformation tank CTT.
Figure 3B:
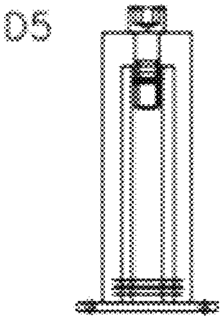
Figure 3C:
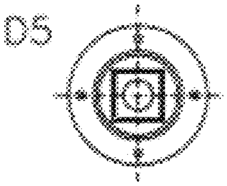

FIG. 3 shows a right-hand side view in longitudinal section in element CTT (C) where the device final spiracles (D5) are shown, the device is shown in complete assembly. The following elements are found: letter (D5) being final spiracles of the device or the so-called gas output, which is produced by the programmed oriented movements POM with upward-downward direction sense with a plurality of internal mechanisms shown in FIG. 3 top view (FIG. 3A) and bottom view (3C) of the detail (D5); letter (A) corresponds to PMOC (programmed movement oriented cylinders); letter (C) shows CTT (capture and transformation tank); letter (E) indicates BSST (basic substance storage tank). FIGS. 3A, 3B and 3C respectively show top, front and bottom views of element (D5) located inside the capture and transformation tank CTT (C).

Figure 4:
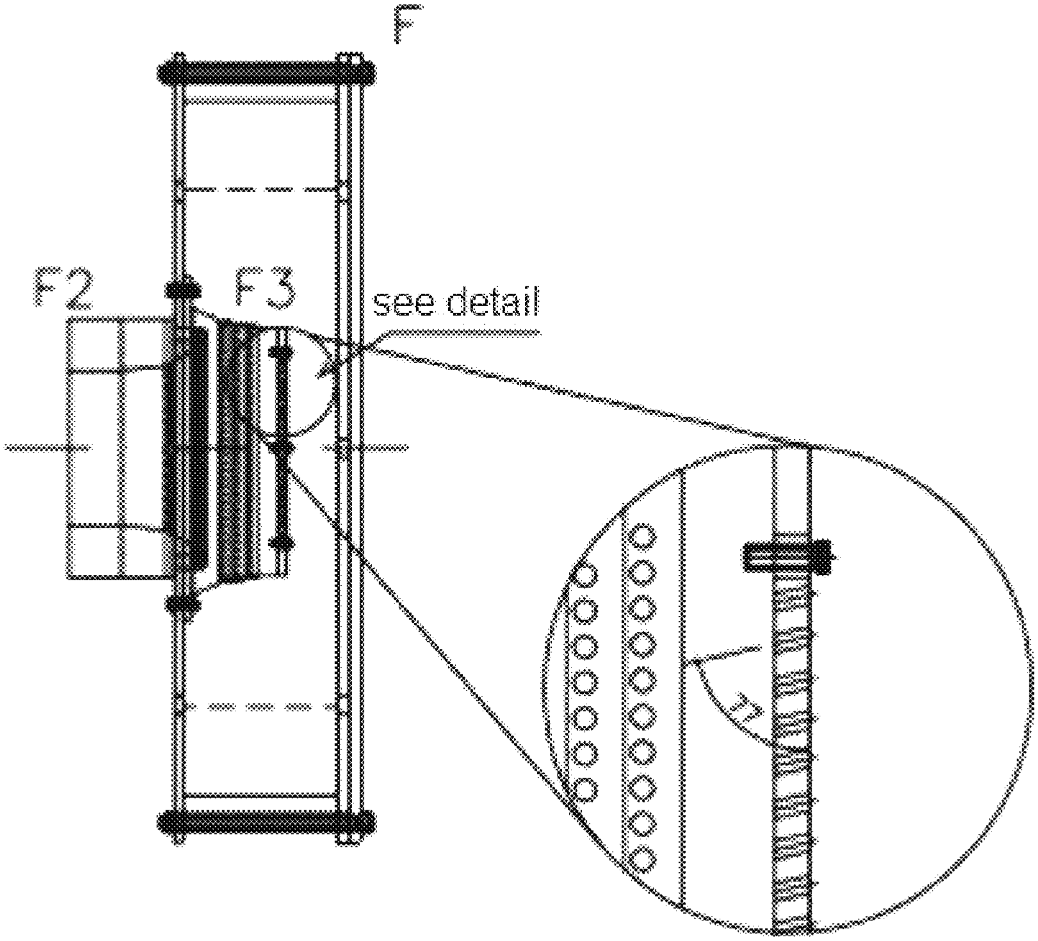
FIG. 4 shows element PSIN (polluting source input nozzle) for the embodiment of the invention corresponding to the direct source presentation.
Figure 4B:
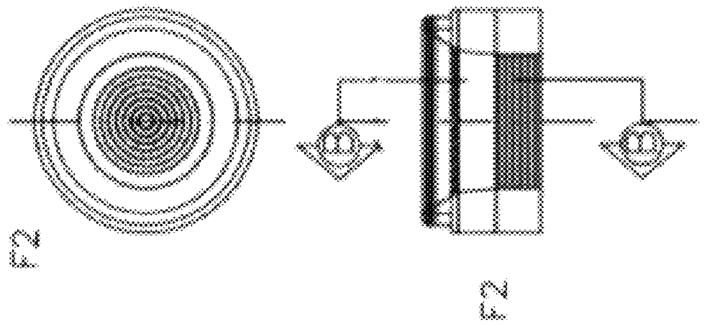
FIGS. 4A and 4B show details of the nozzle and cone in plant and side views of said elements.
Figure 4A:
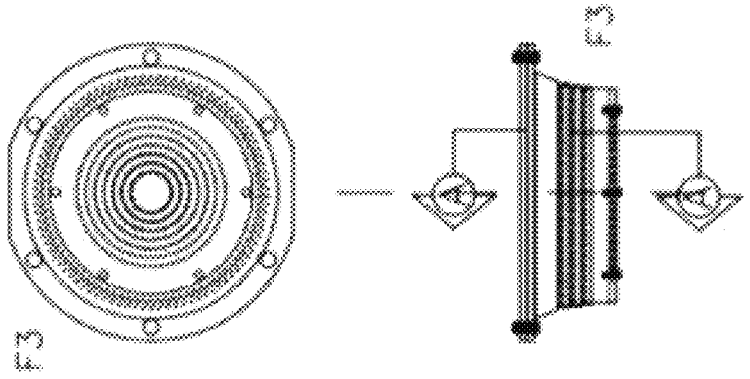
Figure 5:
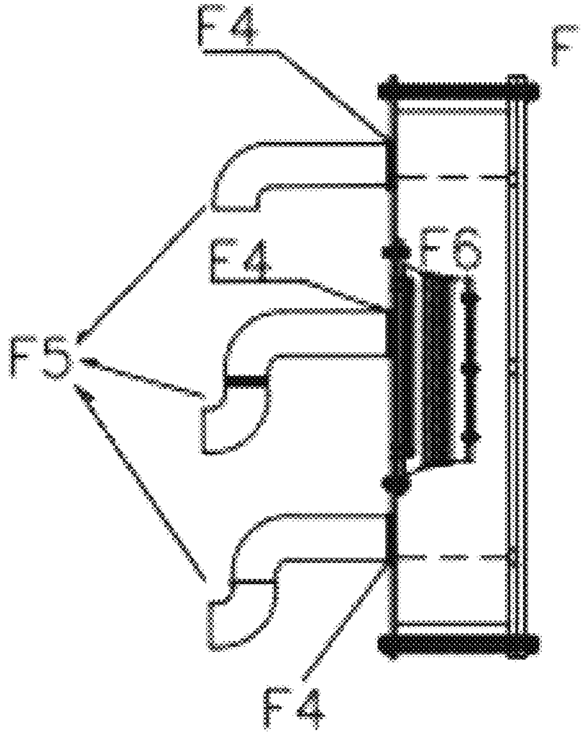
FIG. 5 teaches element PSIN (polluting source input nozzle) for the embodiment of the invention corresponding to the indirect source presentation.

FIG. 4 shows element PSIN (polluting source input nozzle) for the embodiment of the invention corresponding to the direct source presentation (For indirect source see FIG. 5). Letter (F) shows the fixing plate of PISN, perforated in the center so as to allow the gas to flow; letter (F2) indicates the unitary reception nozzle being exchangeable; letter (F3) shows the gas routing fixed distributing cone. FIGS. 4A and 4B feature details of the nozzle (F2) and cone (F3) in plant and side views of said elements.

Figure 5A:
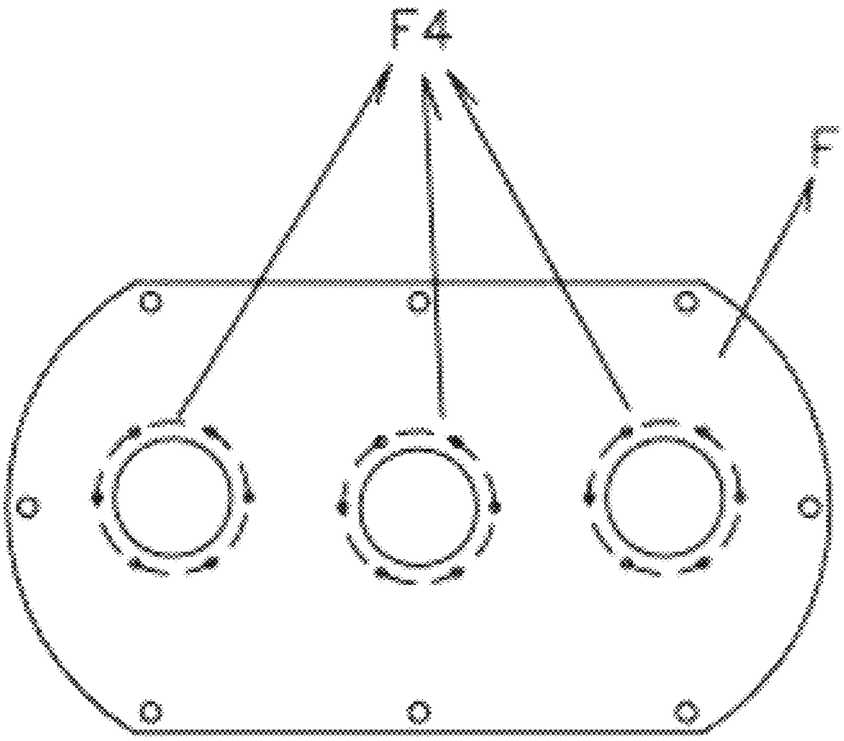
FIG. 5A teaches the front view of FIG. 5 for an embodiment of the invention with three orifices where nozzles are installed.

FIG. 5 teaches element PSIN (polluting source input nozzle) for the embodiment of the invention corresponding to the indirect source presentation. Letter (F) shows the fixing plate of PISN, perforated in the middle with 3 orifices indicated with letter (F4) where the gas flow is allowed; letter (F5) indicates the multiple receiving nozzle being exchangeable; letter (F6) shows the gas routing fixed distributing cone. FIG. 5A teaches the front view of FIG. 5 for an embodiment of the invention with three orifices F4 where nozzles F5 are installed.

Figure 6:
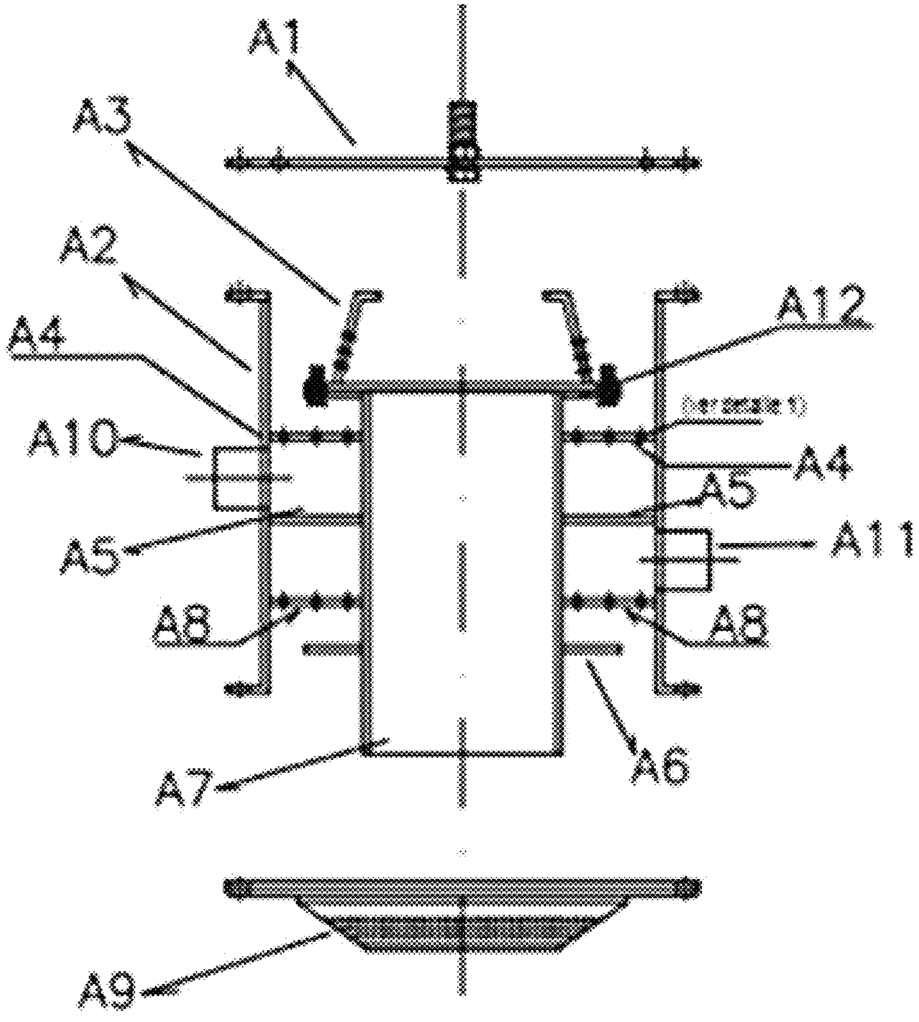
FIG. 6 shows an exploded view of element PMOC (programmed movement-oriented cylinders) of device according to the invention, with longitudinal section, front view.

FIG. 6 shows an exploded view of element PMOC (A) of device (1) according to the invention, with longitudinal section, front view.

Figure 6C:
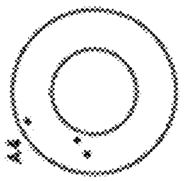
FIGS. 6A, 6B, 6D and 6C respectively show top, front, bottom and detailed views of a cylindrical unit of PMOC subsystem.
Figure 6B:
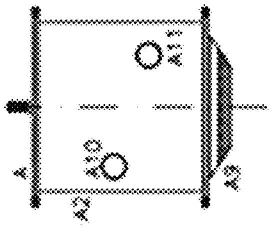
Figure 6D:
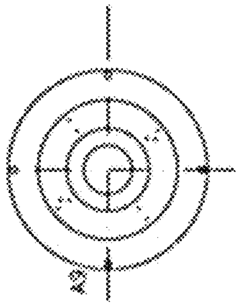
Figure 6A:
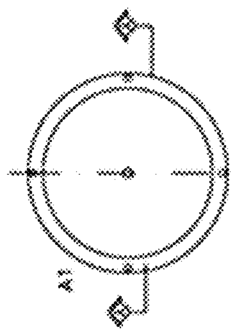

FIGS. 6A, 6B, 6D and 6C respectively show top, front, bottom and detailed views of a cylindrical unit (A') of PMOC subsystem (A). FIGS. 6A, 6B, 6B respectively show top, front and bottom views, wherein the elements composing PMOC are called: letter (A1) for the top plate of the cylinder; letter (A2) for the outer cylinder or outer wall; letter (A3) for the cone trunk plate; letter (A4) for the homogenizing plate (see detail 1); letter (A5) for the dividing plate of upper and lower chambers; letter (A6) for the flow regulating plate; letter (A7) for the inner cylinder or inner wall; letter (A8) for the lower homogenizing plate (see detail 1); letter (A9) for the lower cone trunk plate; letter (A10) for the top chamber feeding input PBS (programmed basic substance) and letter (A11) for the lower chamber feeding input PBS (programmed basic substance); letter (A12) for the upwards plate which the cone trunk support (A3).

Figure 6E:
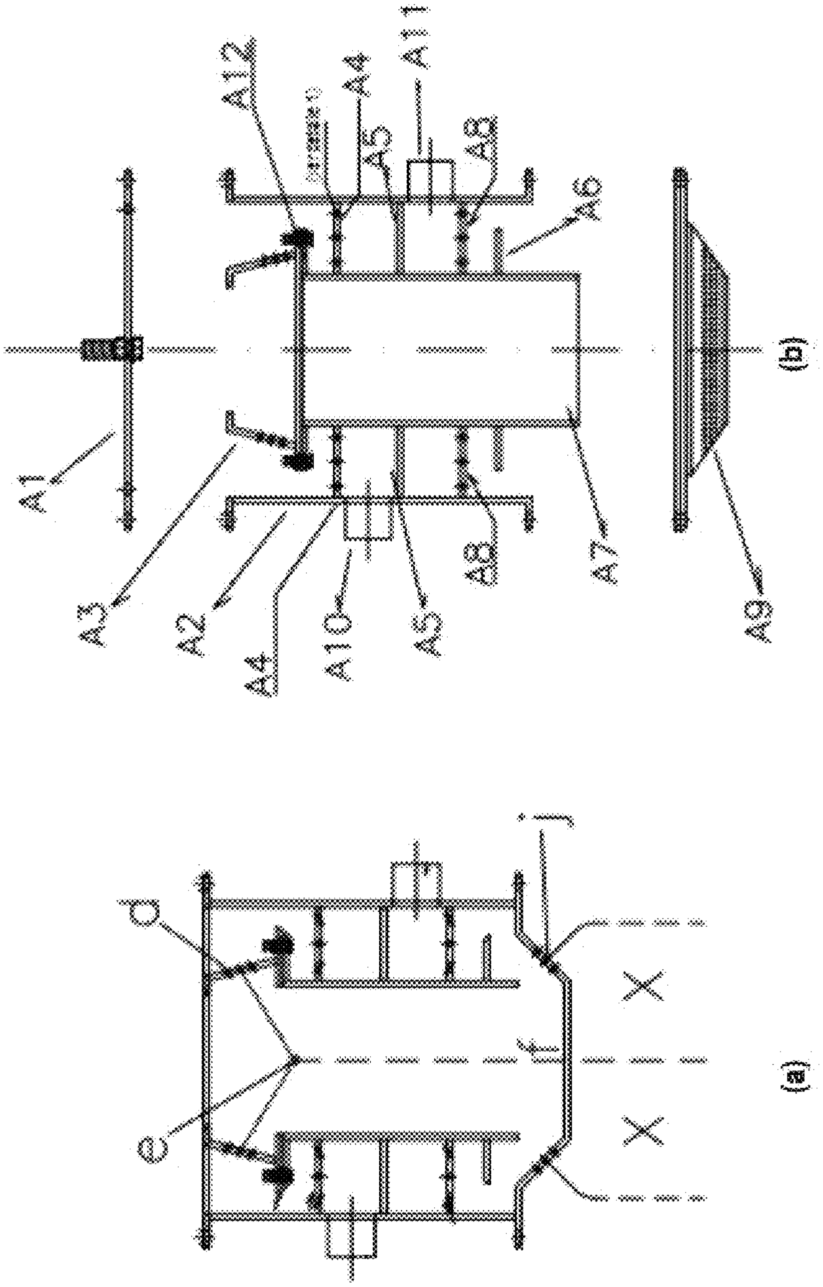
FIG. 6E shows in items (a) and (b) the Euclidean forms X and f formed by the PBS (programmed basic substance) flow through orifices d and j.

Moreover, FIG. 6C shows a plant view of element (A4) surrounding the inner cylinder (A7). FIG. 6E shows in items (a) and (b) the Euclidean forms X and f formed by the PBS flow through orifices d and j.

Figure 7:
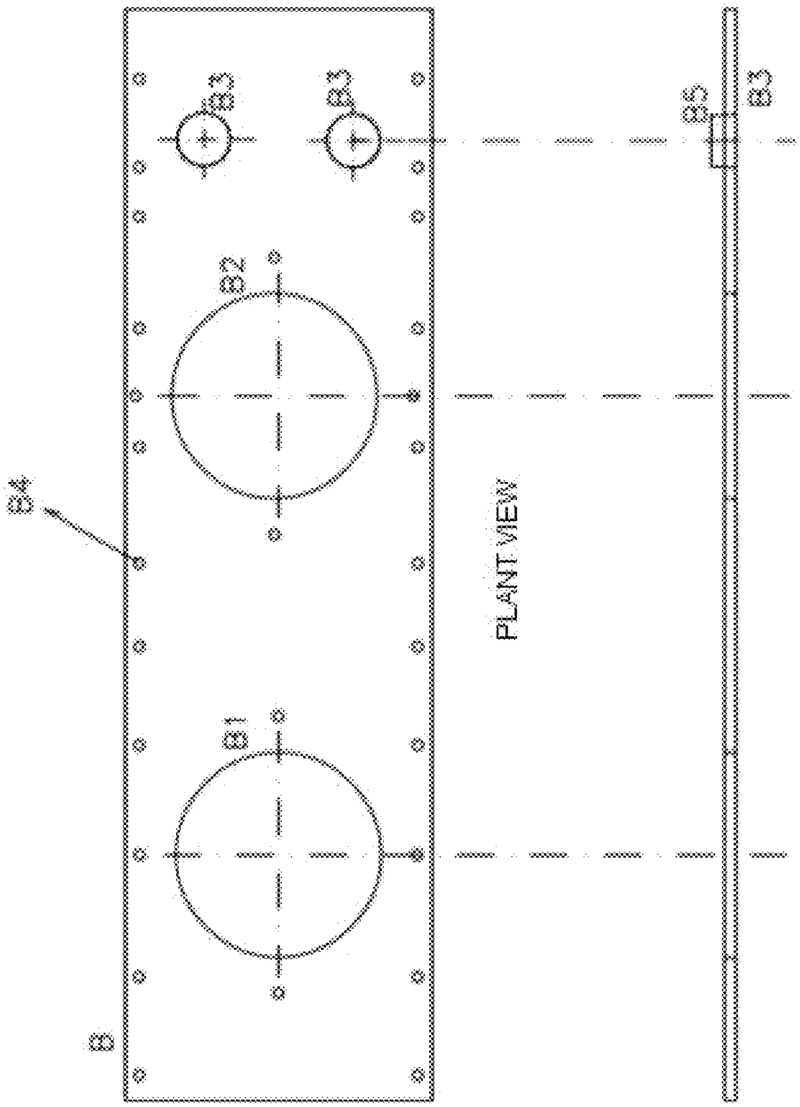

FIG. 7 corresponds to plant and front views of the intermediate plate between elements PMOC (A) and CTT (C). Letters (B1) and (B2) indicate the assembling orifice with the two cylindrical units (A') of PMOC subsystem (A); letter (B3) show the two gas output orifices (see FIG. 3, element D5). The plate is attached to CTT (C) through screws, in the orifices indicated with letter B4. In the front view, the plate having an accessory indicated with letter (B5) located in the hole called (B3) is shown, which is a threaded accessory for attaching the duct I.

Figure 8:
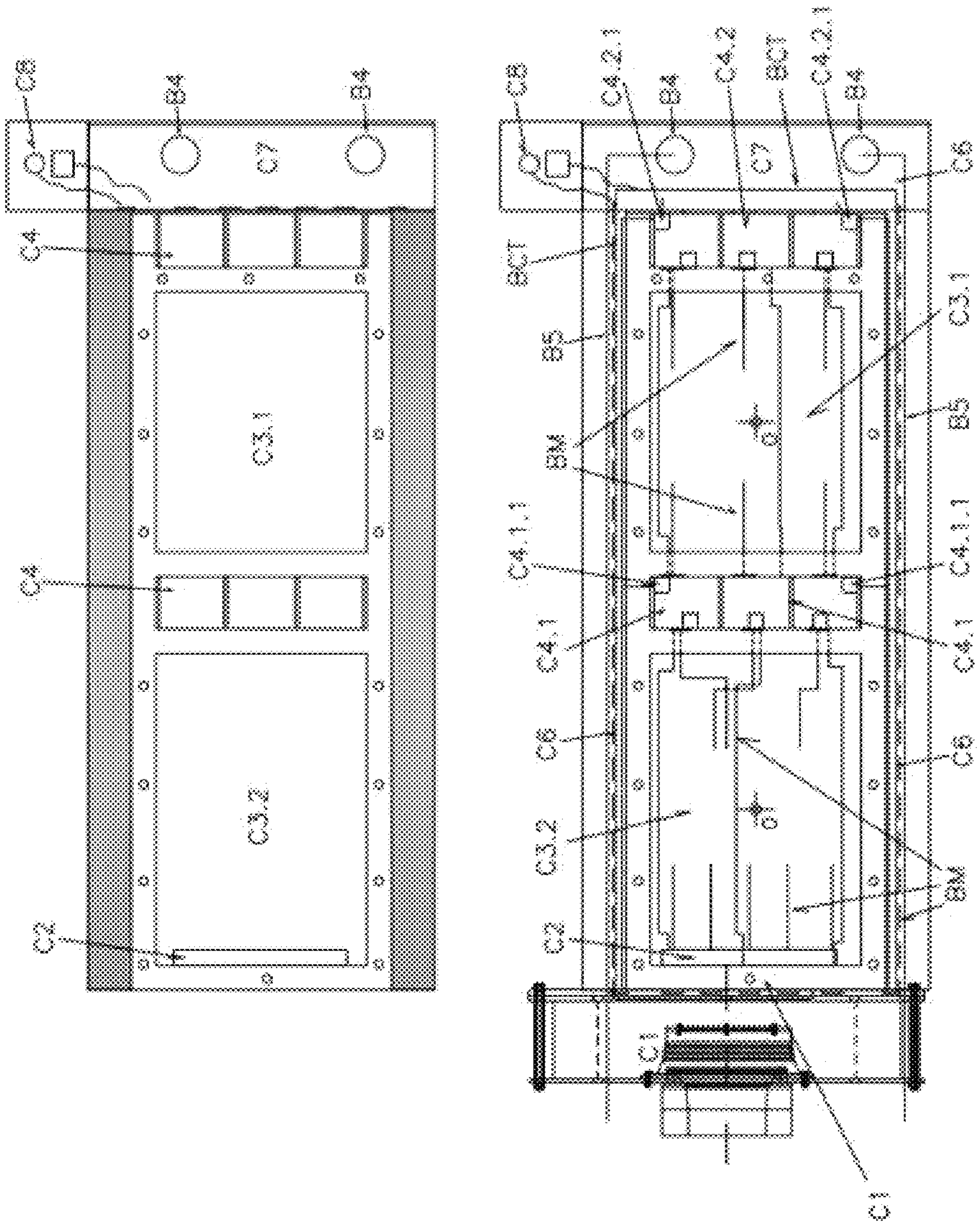
FIG. 8 shows a side longitudinal section of CTT subsystem wherein item (b) shows the inner configuration of CTT subsystem of item (a).

FIG. 8 shows a side longitudinal section of CTT (C) (capture and transformation tank) subsystem wherein item (b) shows the inner configuration of CTT (C) subsystem of item (a), wherein the components of this element are distributed in 8 compartments, these elements are: letter (C1) for the main or receiving entrance: polluting source (see FIGS. 4 and 5); letter (C2) for the duct distribution plate which are called and indicated with letter (BM) (mechanical bronchioles); letter (C3.2) for the first PBS (programmed basic substance) precipitation compartment where the direction of particulate material by ducts is located; letter (C4.1) for the first mechanical sockets (AM) compartment (indicated with letter C4.1.1) which are gas receiving POM mechanical elements; letter (C3.1) for the second PBS (programmed basic substance) precipitation compartment where similarly directionality of particulate material by mechanical bronchioles (BM) ducts is located; letter (C4.2) for the second mechanical sockets (AM) compartment (indicated with letter C4.2.1); the cavity indicated with letter (C8) describes a temperature transfer system by solar system and letter (C6) shows the heat conducting ducts for this system in (C8); letter (C7) describes the last gas recirculation, measurement and final output compartment.

Figure 9:
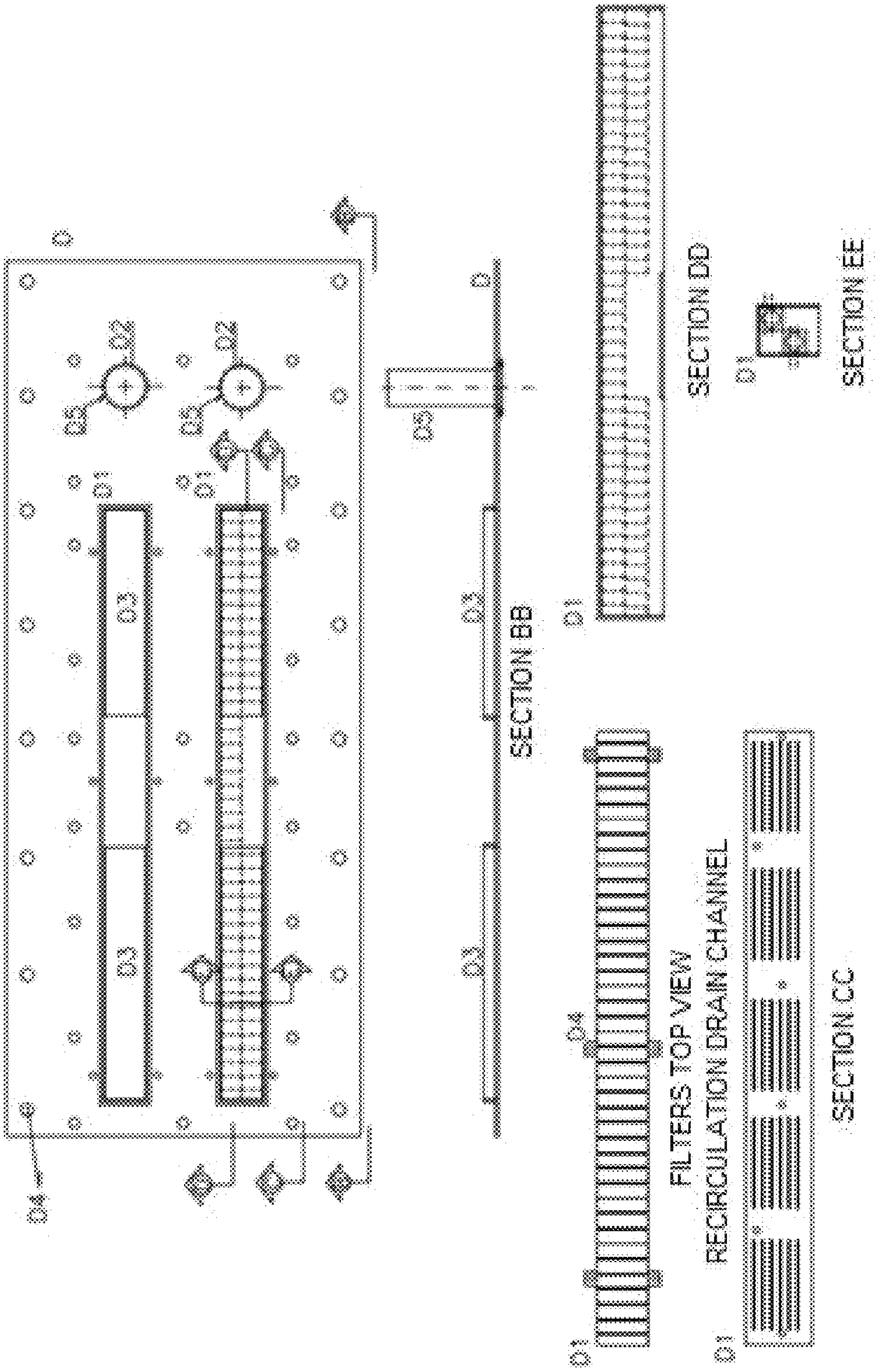
FIG. 9 shows a plant view of the intermediate plate between CTT subsystem and the BSST subsystem (basic substance storage tank).

FIG. 9 shows a plant view of the intermediate plate (D) between CTT (C) subsystem and the BSST (E) subsystem. It also shows a front view of said plate where elements (D5) and (D3) are observed. Element (D5) corresponds to one or more spiracles (D5) which allow recirculation inside the compartment (C7) of gas or air treated after exiting towards ducts (1). These spiracles (D5) comprise an internal mechanical system containing one or more concentric cylinders thus forming a maze system which facilitates the upward and downward recirculation of gas coming from BSST (E) subsystem.

Elements composing this element are: letter (D) for a generalized view of the plate; letter (D3) for the guides where the drain channel and recirculation system indicated as (D1) is deposited which direct the PBS (programmed basic substance) towards the inside of BSST (E), in FIG. 9, the exchangeable mechanisms producing POM are described obtaining in its refrigeration movement in the programmed basic substance indicated with section D-D and section E-E, which are attached to plate (D) through fasteners indicated as (D4); letter (D2) indicates the adjustment element for accessory (D5) (see FIG. 3 —element D5).

Figure 10:
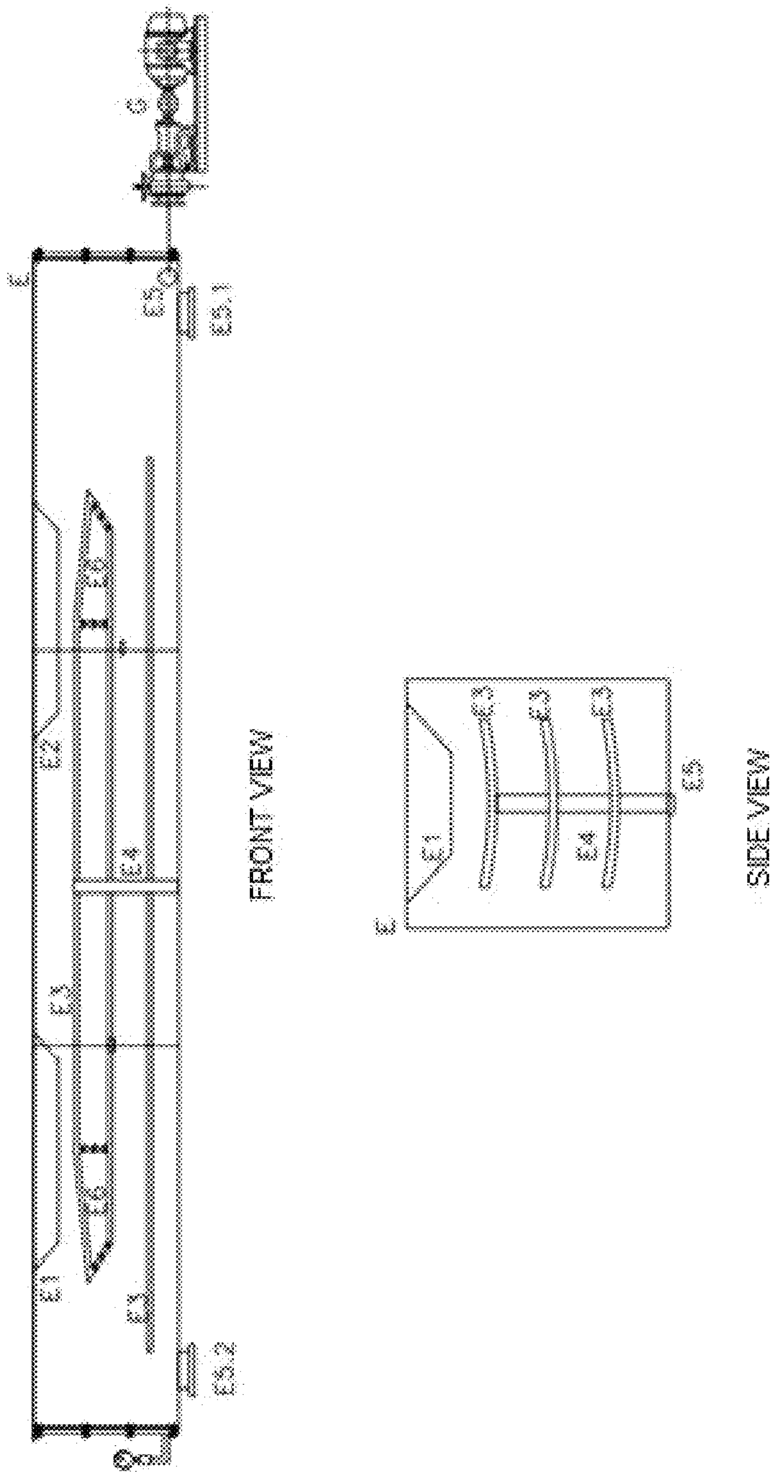
FIG. 10 shows a side section longitudinal view of the BSST subsystem and the internal configuration of elements comprising this piece.

FIG. 10 shows a side section longitudinal view of the BSST (E) (basic substance storage tank) subsystem and the internal configuration of elements comprising this piece, wherein letter (E3) indicates the longitudinal stepped plates for displacement, cooling and precipitation of PBS (programmed basic substance); letter (E4) indicates a plate (E3) fastening vertical plate; letter (E5.2) indicate a draining system and letter (E5.1) indicates a valve for extracting PBS (programmed basic substance); letter (G) indicates the PBS (programmed basic substance) recirculating centrifugal pump, which is supplied by the mechanism (E5) located on BSST (E).

Figure 11:
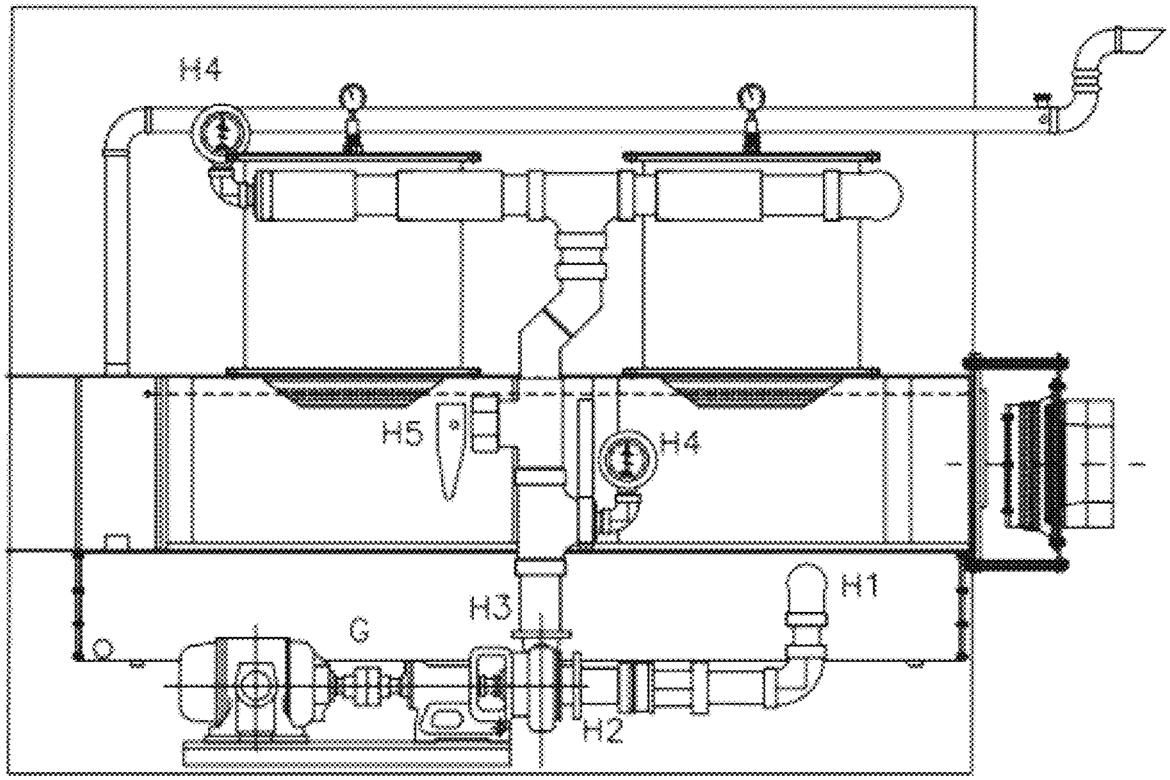
FIG. 11 corresponds to a side view of device according to the invention, wherein the PBS (programmed basic substance) recirculation and addressing system contained in the subsystem is shown.

FIG. 11 corresponds to a side view of device (1) according to the invention, wherein the PBS (programmed basic substance) recirculation and addressing system contained in the BSST (E) subsystem is shown. Letters (H1) and (H2) indicate the first displacement or first duct from the BSST (E) to the centrifugal pump (G).

Figure 11A:
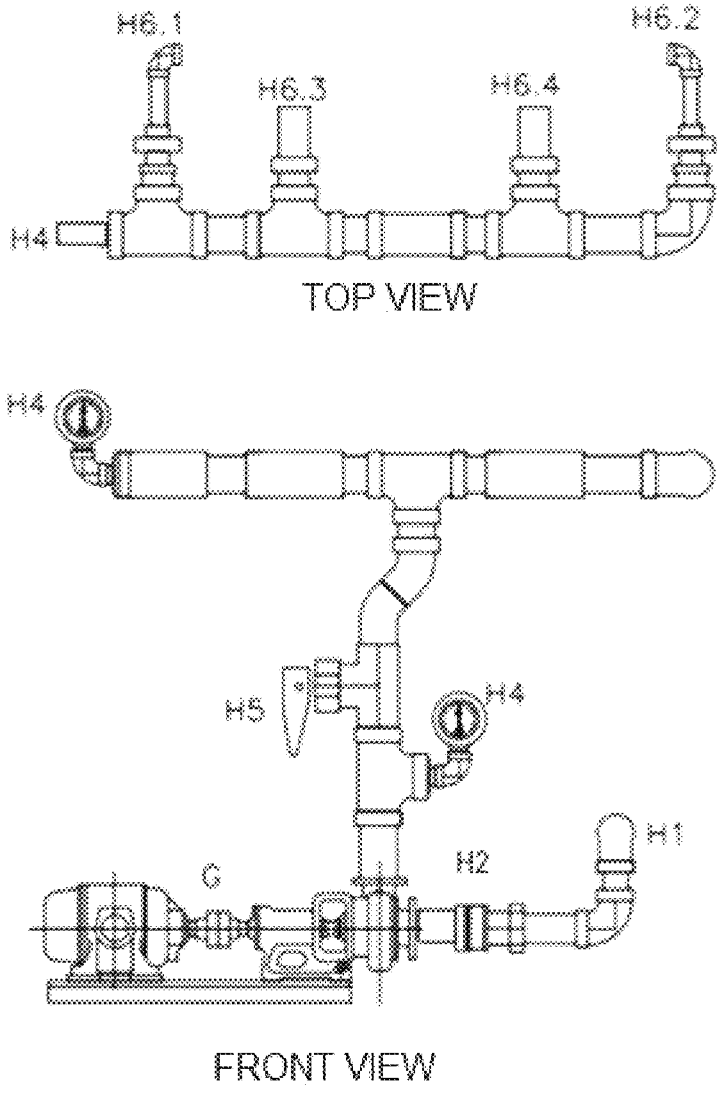
FIG. 11A shows a top view of the elements composing the programmed basic substance recirculation and addressing system.

FIG. 11A shows a top view of the elements composing the programmed basic substance recirculation and addressing system. These pieces are: letters (H1) and (H2) indicate the first displacement or first duct from the BSST (E) to the centrifugal pump (G), supplied with the mechanism indicated as (E5) (See FIG. 10); letter (H3) indicates the second coupling to the centrifugal pump, which will supply the elements indicated as (H6.1, H6.2, H6.3 and H6.4) with PBS; letter (H4) indicates two pressure and temperature metering devices of PBS, letter (H5) indicates the substance pressure regulator; letters (H6.1, H6.2, H6.3 and H6.4) indicate the coupling ducts to the cylindrical units (A') of PMOC (A) subsystem.

Figure 12:
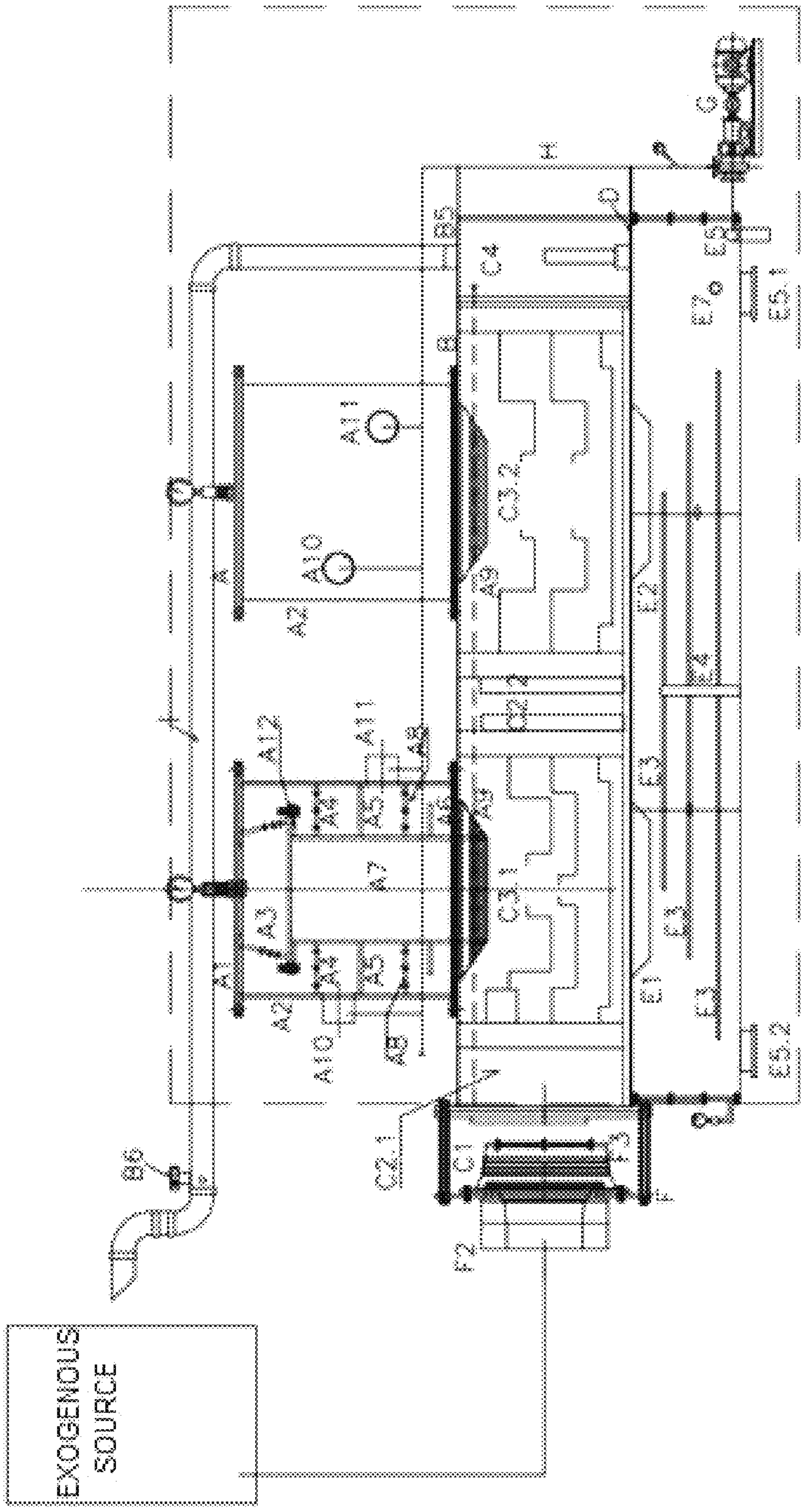
FIG. 12 corresponds to the general and disengaged scheme of each of the pieces of the capture and transformation system.

FIG. 12 corresponds to the general and disengaged scheme of each of the pieces of the capture and transformation system.

Figure 13:
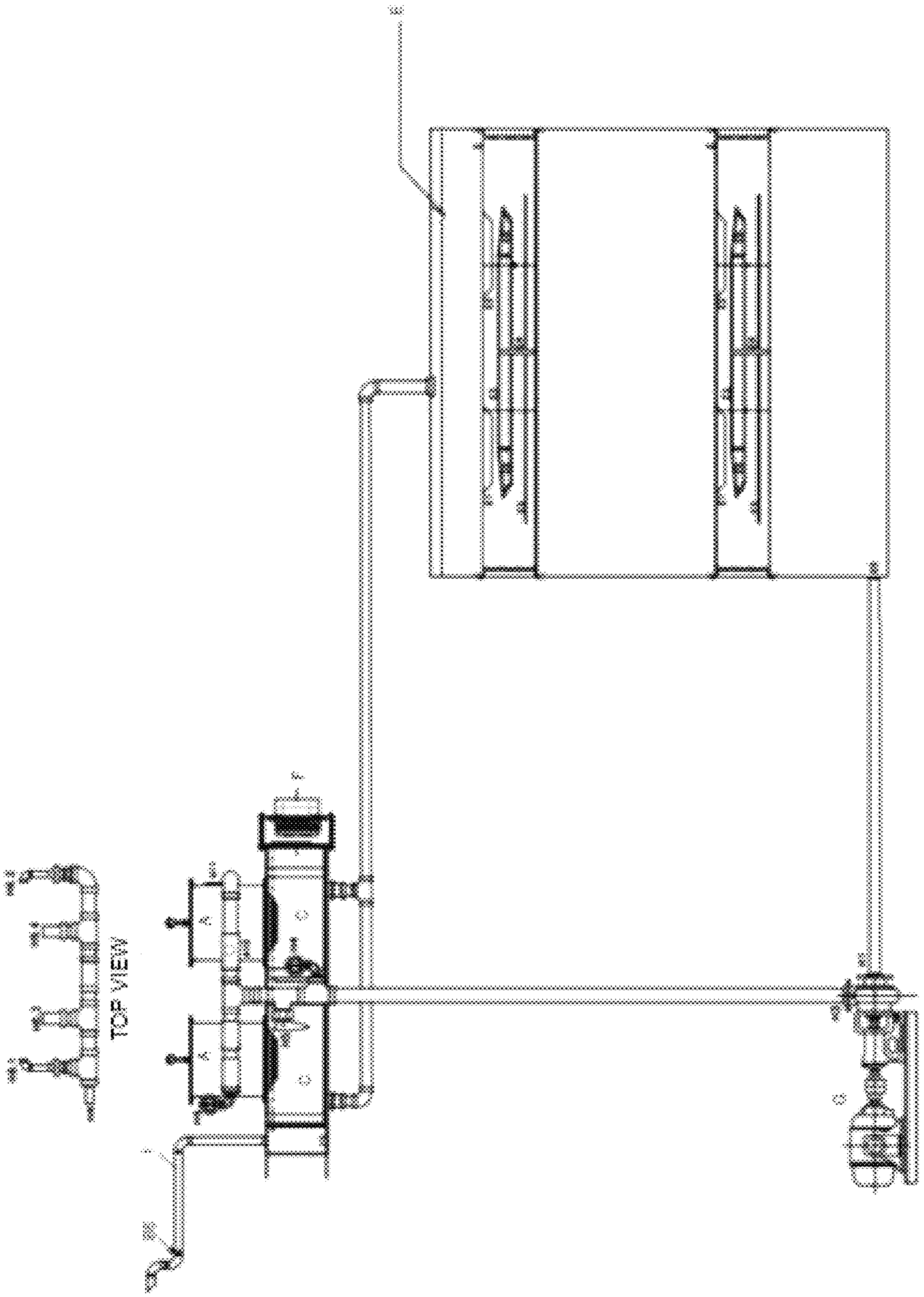
FIG. 13 shows an embodiment of the invention in which the tank or subsystem is separated and distanced from the capture and transformation tank CTT (C) and the PMOC (A) subsystem.

FIG. 13 shows an embodiment of the invention in which the BSST (E) tank or subsystem is separated and distanced from the capture and transformation tank CTT (C) and the PMOC (A) subsystem and wherein the BSST (E) subsystem may have one or more vertical plates (E4) for attaching plates (E3).

The exploded view can be evidenced via letters where each of them accompanied with a number belongs to a unitary system, at the end all the systems are joined to create the functional organism. Initial letters of the exploded view respond to the following systems: letter (A) and its parts in numbers correspond to the "circulatory" system of cylindrical units (A') of PMOC (A) subsystem; letter C and its number parts correspond to the "respiratory" system for gas in CTT (C) subsystem; letter (E) and its number parts correspond to BSST (E) subsystem; letter (F) and its numbers correspond to the coupling of the polluting source; letter (B) describes the technical characteristics and the processes for the intermediate plate; as well as letter (D) (separations among systems), letter (G) indicates the centrifugal pump commercial mechanism and its function is to perform recirculation of the programmed basic substance (PBS) in the entire system.

BRIEF DESCRIPTION OF THE INVENTION

Aire pollution comes from several sources. On one hand, natural processes affecting the air quality include volcanic activity which produces particulate material and forest fires which produce smoke and carbon monoxide.

On the other hand, artificial processes created by man are a polluting source of air, since they produce a high rate of polluting gases produced by fixed polluting sources (industries) and other movable ones (automobiles). These polluting sources produce substances such as carbon dioxide, carbon monoxide, hydrocarbons, nitrogen oxides, sulfur oxides, chlorofluorocarbon and ozone compounds, among other which along with the chemical industry polluting sources, transform into particulate material, which is suspended, becoming in the most complex contaminants, since these are a series of imperceptible solid elements dispersed in the atmosphere and generated from any anthropogenic and/or natural activity.

The present invention is directed to a device which comprises a mechanical technology assembly with basically three elements with oriented and programmed movements, which design and creation is made in encouragement and analogy with three morphologic systems of living beings. The first one is to the cardiovascular system, relating a hematosis process, the second one is to the respiratory system (a respiration mechanic: inspiration and expiration) and finally to the digestive system The set of elements is based on the principle of capturing and transforming the particulate material and gases expelled from a variable external source. The device works from the use of renewable energies and the combination of vector quantities in three dimensional spaces formed by a basic liquid substance which is expelled with a determined pressure through a recirculation system in the same device, this is allowed from piping systems inside the PMOC (A) and CTT (C) subsystems (which are attached to the BSST (E)

subsystem). By means of the combination of mechanical processes with programmed basic liquid substances, results in capture and transformation of the particulate material via physical-chemical capture are obtained, thus achieving a raw material which is useful for further application in industrial processes.

In this regard, the device according to the present invention comprises three mechanical elements with different sizes and geometries. The construction of each one is made and assembled by individual parts and are attached by screws and argon electrical welding, complying with the design mechanical planes as shown in the figures accompanying this specification. The three mechanical elements are attached by intermediate plates and screws. Each one is located in an strategic place, where the transformation is performed via the continuous recirculation of the basic substance until obtaining a programmed concentration which would work as raw material for a plurality of industrial applications.

The general mechanical elements forming the device are: PMOC (A): Programmed movement oriented cylinders; CTT (B): capture and transformation tank; and BSST (E): basic substance storage tank, as shown in FIG. 1.

DETAILED DESCRIPTION OF THE INVENTION

The present invention is directed to a particulate material retaining device (1), which comprises a PMOC (A) subsystem which is a set of element with cylindrical external geometry having insider the same a plurality of mechanical elements which produce some programed oriented movements, which can be manufactured in materials such as steel, polymers and other materials, depending on the nature of the basic pH substance to be circulated inside it. This PMOC (A) subsystem is, further, characterized by having inside it a plurality of perforations (see in FIG. 6, 6A, 6B, 6C, 6D) in and oriented and directed mechanical process for creating defined and fixed transversal movements through a continuous flow with pressure, tension and application of forces coming from a centrifugal pump (G) over the basic pH substance or programmed basic substance (PBS). The function of the PMOC (A) subsystem is the displacement of the basic pH substance over axes x, y, z of the cylindrical elements or cylindrical units (A').

In this sense, the device of the invention may comprise one or more PMOC (A) subsystems, which in turn, may comprise two or more independent elements or cylindrical units (A'), but with the same functional objective and designed identically as shown in FIG. 6, each of the cylindrical units (A') of the PMOC (A) system has a cylindrical geometry and are semi-hollow and are located on top of the plate (B).

The functioning of the cylindrical units (A') is to displace the PBS (programmed basic substance) coming from the ducts which have been driven by the centrifugal pump (G) (see FIGS. 11 and 12). The PBS (programmed basic substance) within the cylindrical units goes in a direction both upwards and downwards. The PBS (programmed basic substance) circulation inside the PMOC (A) subsystem will form a geometry of an arched cylinder, homogeneous and hollow of liquid, located in the lower inner part of the cylindrical units (A') of the PMOC (A) subsystem (in plate A9—see FIG. 6), precipitating towards the inside of the CTT subsystem (B) and a geometry of a linear, compact and homogeneous cylinder created by precipitation of PBS (programmed basic substance) by the top chamber of the cylindrical units of PMOC (A) subsystem (in the mean line of cylinder A7—see FIG. 6), similarly precipitating to the inside of the CTT subsystem (C).

This PBS (programmed basic substance) recirculation inside the cylindrical units (A') of PMOC (A) subsystem provides a void oxygenated by the geometries created in precipitating the PBS (programmed basic substance), which void will be placed where PBS (programmed basic substance) and the amount of particulate material in inner areas of the CTT (C) subsystem meet.

The PMOC (A) subsystem has inside each cylindrical unit (A') a plurality of plates pierced in varying dimension, perforations and angles, with design of internal programmed oriented movements of PBS (programmed basic substance), which comply with a variety of functions in the displacement of liquid and thus to obtain the objective of capture and transformation of particulate material. Its manufacture material is variable, from recycled polymeric material to ferrous or nor-ferrous metal materials, light or heavy. As mentioned above, each cylindrical unit (A') is located on the upper part of CTT subsystem (C) assembled with screws to the same CTT subsystem (C) and separated to each other, symmetrically.

The position of the plates is functionally distributed to increase the pressure of the PBS when making its displacement, thus the impregnation of the PBS with the particulate material will be greater, this is through a physical-chemical process called adhesion/cohesion.

Each cylindrical unit (A') of the PMOC subsystem (A) consists of 12 pieces, according to FIG. 6, an external cylinder (A2) can be seen with wall operation or external covering of the cylindrical unit (A'); a divider plate (A5) that divides each of the cylindrical units (A') into two chambers, one ascending and one descending; an inner cylinder (A7) concentric to the outer cylinder (A2) that allows the dividing plate (A5) to be joined for greater firmness in the structure; each chamber (ascending and descending) are supplied by the ducts coming from the centrifugal pump (G) that are connected to the adapters inlets (A10 and A11).

In relation to the ascending chambers, these have a progression of 4 discs. The first disk is the plate (A4) which, as illustrated in FIG. 6, is attached to the inner cylinder (A7) and to the outer cylinder (A2), located dorsally to the plate (A5) and of circular geometry, hollow in the center and perforated in its entire surface to allow the displacement of the PBS liquid upwards. The second disk is the ascending plate (A12) of circular geometry, hollow in the center and located in the ascending intermediate length of the upper chamber of the cylindrical unit (A') and attached to the inner cylinder (A7). Its function is to direct the PBS towards the outer and upper walls of the interior of the ascending chamber, thus obtaining directional pressure on the bottom side of the plate (A1) and the angular walls of the plate (A3) as shown in FIG. 6.

The third disc is the ascending plate (A3) located on the inner upper surface of the cylindrical unit (A'). Its geometric shape is a cone segment with a lower base of greater diameter and an upper base of smaller diameter designed with a plurality of staggered perforations in its generatrix and with a direction of 45° each, perpendicular to the Y axis of the cartesian coordinates of the base of the cone segment where this ascending plate (A3) is held by a system of screws and a mechanical sealing system in its lower base through an O-ring with the plate (A12). In the upper part of the cone segment, an internal seal is made with the plate (A1) of the cylindrical unit (A'), on its upper surface, via an accommodation of an O-ring. When the PBS moves through the ascending plate (A3), due to the plurality of perforations at 45°, will perform a programmed geometry of the substance that goes to the zero point (e) of the projection (see FIG. 6E, dotted lines—middle and lateral) creating a cylinder with a compact and solid liquid appearance, which is directed to fulfill the capture and transformation function inside the CTT (C) subsystem (when it descends). The fourth disc is the outer plate (A1) whose function is to be the outer covering cap of each of the cylindrical units (A') of the PMOC subsystem (A). As for the Euclidean forms, as shown in FIG. 6E (a), they correspond to the spaces or voids (X) and (f) formed by the continuous flow of the PBS (programmed basic substance) through the holes (d) in element A3 that converge at point (e) (FIG. 6E.a) and holes (j) of the element (A9).

Regarding the descending chamber, it has a progression of 3 discs. The PBS that moves through this area, enters through the connection of the external adapter (A11), as illustrated in FIGS. 6 and 6B, and is driven by the mechanical action of the centrifugal pump (G) towards the lower interior of the cylindrical units (A') of the PMOC subsystem (A). The first disc of the descending chamber is the plate (A8) (FIG. 6), with a circular and hollow geometric shape, welded on its outside diameter with the inside of the cylinder (A2) and welded on its inside diameter with the outside of the concentric cylinder (A7). This first disk (A8) has a plurality of perforations on its upper face in a variety of diameters, distributed at 30° in relation to point 0 of the X axis of the Cartesian plane. Its function is to homogenize the speed and flow of the PBS at the initial inlet inside each cylindrical unit (A') of the PMOC subsystem (A) in the downstream direction. The second disc is the plate (A6) located in the descending intermediate length of the lower chamber of each cylindrical unit of the PMOC subsystem (A), welded on the inner perimeter with the internal concentric cylinder (A7), under the plate (A8), with an external diameter corresponding to the average diameter of the plate (A8) on its outer periphery turned at 45°. Its function is to direct the PBS towards the external walls inside the cylinder (A2) and obtain pressure from the liquid directed to the lower external walls of the cylinder (A2) and towards the angular walls of the plate (A9) located at the bottom of each cylindrical unit (A') of the PMOC subsystem (A).

Related to said plate (A9), this corresponds to a geometric shape of a semi-cone with a lower base of smaller diameter and an upper base with a larger diameter. It is designed with a plurality of staggered perforations located in the middle surface of the semi-cone generatrix, distributed in 3 diameters of average length and with a direction of 45° perpendicular to the "Y" axis of the symmetrical coordinates of the bases of the semi-cone of the plate (A9). This plate is held by a system of screws and a mechanical sealing system at its lower major base via an O-ring and is in contact with the intermediate plate (B) (FIGS. 7 and 7A), which is in contact with the CTT (C) subsystem. The generalized function of the descending chamber is completed with the plate (A9) since the PBS precipitates and, when passing through the plurality of perforations of said plate (A9), it projects in a cylindrical, uniform and homogeneous geometric shape with precipitation inside the CTT (C) subsystem system where the capture and transformation of the particulate material occurs.

The internal design of the cylindrical units (A') of the PMOC subsystem (A) is based on the principle of operation of a "cardiovascular" system of an organism of a superior living being. The heart of a living being has two atrium and two ventricles. In the case of the decontamination device of the invention, for example, with two cylindrical units (A'), it has 4 circulating chambers, two superior or ascending and two inferior or descending, i.e. it would comprise "two hearts" resembling to a circulatory system in terms of collection, recirculation and pressure increase of a key substance, which in the case of the present invention is denominated PBS, being this substance analogous to blood since it transports and transforms contaminating components, that as solutes, they are present in that substance.

Now, referring to the plates (B) and (D) that separate the subsystems (A), CTT (C) and BSST (E) respectively. The upper intermediate plate (B) (see FIGS. 7 and 7A) is characterized by its rectangular geometry and the plurality of threaded holes (B4) and other assembly holes (B1) and (B3) of different diameter. The upper intermediate plate (B) is the support and accommodation in the assembly perforations (B1) for the plates (A9) of the cylindrical units (A') of the PMOC subsystem (A). It also allows, in the upper interior area of the subsystem CTT (C), a hermetic seal control that prevents a leak of the PBS from the cylindrical units (A') of the PMOC subsystem (A) or a leak of the particulate material. This intermediate plate (B), as illustrated in FIG. 7, has two adapters (B3) on the upper lateral surface that are the assembly of the ducts (1) (see FIG. 1) which transport the clean gas to the outside area of the device of the present invention.

The second mechanical subsystem has a convex rectangular geometry and has been denominated the Capture and Transformation tank (CTT) (C) which is fixed to the lower part of the cylindrical units (A') of the PMOC subsystem (A) by the upper intermediate plate (B) described above. The CTT (C) subsystem can be manufactured from stainless steel, polymers, aluminum or other suitable and resistant materials depending on the basic pH substance (PBS) that will be applied to the complete system. At one end of the CTT subsystem (C) is located the inlet (F2), for a single inlet, or (F5) for multiple inlets of particulate matter, i.e. the source of contamination, for example, by combustion of fuels. The CTT (C) subsystem includes strategically located ducts, called mechanical bronchioles (BM), in variable dimensions, that deposit the particulate material in a plurality of traps or mechanical alveoli (AM) designed for capture and transformation through the PBS.

There is an assembly of the cylindrical units (A') of the PMOC subsystem (A) aligned with the intermediate plate (B) as shown in FIGS. 3, 8 and 12. This allows the admission of the PBS, precipitated by said cylindrical units (A'), to the CTT (C) where the latter joins the BSST (E) unit through the assembly with the lower intermediate plate (D) (FIGS. 3, 8 and 12) with which the capture and transformation vacuum of the particulate material is created, which is distributed via the mechanical bronchioles (BM) within the CTT subsystem (C) (FIG. 8) towards the mechanical alveoli (AM) which are represented as a square indicated by the components: (C4.1, C4.1.1, C4.2, and C4.2.1.).

The final addressing of the gas towards the CTT outlet (C) is responsible for bringing the gas from compartment C7, which is a recirculation compartment towards the outlet (B3) (see FIGS. 7, 8 and 12), as a clean gas outlet, The CTT (C) has a programmed distribution of bars with solar temperature transfer in compartment C6-C8 indicated as BCT (see FIG. 8).

As previously mentioned, the CTT (C) subsystem has a convex rectangular shape (see FIGS. 8 and 2) and is made up of 8 compartments. Each of the compartments houses the gas with particulate material that has been emitted by the indirect or direct polluting source, but in these the precipitation and de-particularization of the gas occurs strategically thanks to the contact between the mechanical alveoli (AM)/mechanical bronchioles (BM) and PBS. The compartments are marked with the letters (C1), (C2), (C3.1)-(C3.2), (C4.1) (C4.1.1-C4.2.1), (C4.2), (C6), (C7) and (C8) as illustrated in FIG. 8. All of these are elements of the CTT (C) and where (C1) corresponds to a cylindrical-oval geometry compartment, its interior geometric shape is hollow, with threaded outlet perforations (¾ NPT) and joins the main body of the CTT subsystem (C).

The first of the compartments is (C1) which is the gas inlet, where the CTT subsystem (C) is connected directly or indirectly to the polluting source through a connection or inlet (F2) and (F3). This connection is given by an element described and indicated for direct source as (F2) and (F3) (see FIG. 4). In another embodiment of the invention shown in FIG. 5, a possible connection configuration or input for indirect source such as (F5) and (F6) is illustrated, where the function of both the connection F2/F3//F5/F6 is the reception of the particulate material coming from the source and directing it into the CTT subsystem (C). In the case of direct source input, the part (F3) that is housed in the compartment (C1) has a rectangular and oval outer geometry at the ends assembled by a series of plates held by a screw connection system; and where said piece (F3), in the inside, is a closed conical trunk, where its minor base is located and held by screws at the lateral entrance of the CTT subsystem (C) and its perforated walls direct the particulate material in different angular directions located in the generatrix of the conical trunk (F3 see FIG. 4), for example, the perforations can be projected towards the inlet chambers of the distributor plate with a perforation axis of 770 in the XY axis as shown in FIG. 4.

When speaking of direct and indirect source, reference is made to the mechanism of gas reception by the compartment (C1). A direct source requires a system designated as (F2) (FIG. 4), where the contaminating mechanism is connected to the decontaminating device of the invention in linear contact. For the embodiment according to the invention where the source is an indirect source, it is understood that it is the one where combustion occurs in open spaces and the collection is required to be carried out through various connections (F5) that carry the indirect source towards the decontamination device (see FIG. 5).

The second compartment C2 of the CTT subsystem (C) is a mechanical system with a hollow or perforated rectangular geometric shape, where its location is adjacent to the main inlet of the compartment (C1) of the particulate material (see FIG. 8), its function is the reception and distribution of the particulate material which is carried out by a plurality of threaded feeder ducts (see FIG. 8A —detail) and by an assembly system of fittings that are the initial connection of mechanical bronchioles (BM) indicated as lines in the cavity (C3.2) of FIG. 8, distributed in equidistant distances and programmed from the origin point 0 of the cartesian plane in relation to the X-Y axes on the front surface of the distributor plate (C2). Its destination in the distribution of particulate material, by means of mechanical bronchioles (BM), is at the points designated as capture and transformation within the CTT (C) subsystem, i.e. the distribution is directed to the mechanical alveoli (AM) indicated as (C4.1)-(C4.2) (See FIG. 8). It is assembled by threaded screws in the compartment (C2) of the CTT (C).

Accordingly, the third compartment mentioned in the previous paragraph is the precipitation cavity (C3.2) which is a housing adjacent to the compartment of the distributor plate (C2). Its location is the center of the axes of symmetry of this compartment where the PMOC (A) is assembled. Inside this cavity compartment (C3.2), there is a plurality of mechanical bronchioles (BM) distributed in directions of programmed order where some come from the distributor plate (C2), fed by the contaminating source (C1), and others regressively come from the compartment of the mechanical alveoli (AM) (C4.1). In this system of mechanical bronchioles (BM) the circulation of particulate material is provided up to this mechanical alveolar system (C4.1) by the technique of recirculation of traps or oriented movements programmed in the labyrinths formed by the mechanical bronchioles (BM) of the cavity (C3.2). All the mechanical bronchioles (BM) fulfill the function of depositing the particulate material in the precipitation vacuum created by the PMOC (A) subsystem and the PBS; It is the first direct meeting of the PBS and the particulate material to carry out the first gas collection. Once this mechanical function combination of the cylindrical units (A') of the PMOC subsystem (A) with the PBS and the recirculation of the particulate material by the mechanical bronchioles (BM) and mechanical alveoli (AM) (C4.1) has been performed, capture and transformation is obtained and is precipitated by means of a D3 mechanical drainage system located (see FIG. 9) inside the CTT (C) subsystem on its lower surface towards the BSST (E) by direct connection of these two base elements.

The fourth compartment is the mechanical alveolus (AM) compartment (C4.1) (see FIG. 8) where the mechanical alveoli (AM) (C4.1.1) is an automatic system for receiving particulate material from the polluting source distributed along the length of the CTT subsystem (C) (See FIG. 8), which is directed towards them by the mechanical bronchioles (BM) which exert initial reception of the particulate material and then the mechanical circulation of the gas in descending and ascending movements in its interior manage to capture the particulate material in this interior route of the area of the mechanical alveoli (C4.1), then perform regressive and advanced distribution through exit mechanisms in the ducts. The particulate material that has made this journey in the mechanical alveoli (C4.1) is again led by a new distribution of output from the mechanical alveoli (C4.1) to the mechanical bronchioles (BM) of the cavity (C3.2) strategically located to direct the particulate material towards the voids (see FIG. 6E).

Regarding the voids, these are created by the precipitation of the PBS by the cylindrical units (A') of the PMOC subsystem (A) inside the CTT (C) subsystem, specifically in the compartments (C3.1) and (C3.2). The mechanical alveoli compartment (C4.1) is located adjacent to the precipitation compartment (C3.2). Three (3) sub-elements (C4.1.1) of the mechanical alveoli (C4.1) are housed in this compartment (C4.1), each of which performs a recirculation function of ascending-descending particulate material and is distributed to the mechanical bronchioles (BM), by the recirculating mechanism, which will again recirculate it (see FIG. 8). Its geometry is rectangular in shape and its lateral location to the mechanical alveoli (AM) allows the reception of particulate material directly from the ducts or the mechanical bronchioles (BM) distributed along the length of the CTT (C) subsystem. The particulate material circulates inside the mechanical alveoli (AM) through internal mechanisms (see FIG. 8, C4.1.1 and C4.2.1) and to be carried out together with the PBS.

The fifth compartment is the precipitation compartment (C3.1), which, as can be seen in FIG. 8, is located between the alveolar systems (C4.1) and (C4.2) of the CTT subsystem (C). This fifth compartment (C3.1) is assembled with the PMOC subsystem (A) on the upper surface of the CTT subsystem (C) allowing the assembly via parallel geometries of the PMOC subsystem (A), the intermediate plate (B) and the upper platform of the CTT (C). This assembly is made by mechanical accessories, for example, screws, gaskets and others. Inside this compartment, a plurality of mechanical bronchioles (BM) are distributed, which are fed from the mechanical alveoli (C4.1) and are directed in programmed places towards the vacuum created by the PMOC (A) subsystem and the PBS. The mechanical bronchioles (BM) and the PBS, in their precipitation, are the second direct contact of the capture and transformation of the particulate material. The PBS, once impregnated with the particulate material, is precipitated through drains located inside and in the lower part of the fifth compartment of the CTT (C) (See FIG. 9, element D3).

The sixth compartment is the mechanical alveoli system compartment (C4.2) (see FIG. 8). In this compartment there are also 3 mechanical alveolar sub-elements (AM) of rectangular geometry that are fed by the system of mechanical bronchioles (BM) coming from the fifth precipitation compartment (C3.1) in its internal front contact and also assortment by the mechanical bronchiole system (BM) of direct distribution from the distribution plate of the second compartment (C3.2), which, at its average height, distributes particulate material through the lateral corridors; inside of it, it makes contact with the mechanical alveoli (AM) of the compartment (C4.2), being these receptors of this particulate material and with a re-circulatory function inside via descending and ascending movements to be later distributed by internal mechanisms to the mechanical bronchioles (BM) that are directed towards the voids of the precipitation compartment (C3.1).

The seventh compartment is the gas recirculation and outlet compartment (C7, see FIG. 8) which is adjacent to compartment (C4.2) and is the compartment that receives gas from the entire CTT recirculation subsystem (C) fed by the movements of the subsystem of mechanical bronchioles (BM), mechanical alveoli (AM), the PMOC subsystem (A) and the PBS. This gas is the clean gas resulting from the capture of particulate material throughout the entire purification process carried out with the device according to the present invention. Inside there is a mechanism (D5) (see FIGS. 3A, 3B, and 9) where the outlet gas, that has been filtered to the BSST (E), is made through ducts assembled in the intermediate plate (B4) (see FIGS. 7 and 8).

The eighth compartment is the solar temperature transfer system (C8) (see FIG. 8). Inside the CTT (C) subsystem there is a rod with thermal conductivity (see FIG. 8, element BCT) where its location is around the entire upper internal periphery of the CTT (C) subsystem and external periphery of the C2 to C6 compartments which performs the capture of particulate material by direct contact in areas of transferred heat. In other words, the CTT (C) subsystem comprises longitudinal cylindrical shaped mechanisms fixed parallel to the side walls on its internal upper surface, for example, but not limited to, heat conductive pipes connected to renewable energy systems located on the outside of the device which help to capture the material through the temperature generated by the system where that heat is conducted into the device. (see FIG. 8 C6).

The term "trap" in the context of the present invention, refers to the geometry formed by the liquid surface of the PBS when it is ejected with a specific pressure through the grooves of the PMOC (A) subsystem. The concept of trap arises from the result of the Euclidean geometric shape formed thanks to the surface tension where the film formed by the PBS expelled by the holes creates a surface that offers resistance to gas breakage, where said liquid film traps, encloses or confines the gas with the particulate material that enters directly through the (C1) of the CTT system (C) (see FIG. 8). A physical-chemical reaction take place on the surface of the PBS liquid in order to chemically neutralize the gases and acids present in the polluted air, trapping as much particulate material as possible thanks to the deposited volume.

The device of the invention has a lower intermediate plate denominated as (D) (see FIG. 9). Its geometry is rectangular in shape with a plurality of threaded perforations, indicated as (04), on the longitudinal and transverse sides whose function is the output of gas through a mechanical internal operating system that has been purified inside the BSST (E) subsystem serving also as a fixing and sealing mean though screws and gaskets to said BSST subsystem (E) with the plate (D) on its upper surface, for example, but not limited to neoprene. Likewise, it serves as a fastening and seal to the CTT subsystem (C) through screws and packing or seal on its lower surface with the plate (D) (see FIG. 12), for example, but not limited to neoprene. This plate (D), on its upper surface, has a plurality of guides (D3) (see FIG. 9) that are symmetrically aligned in the lower interior of the CTT subsystem outlet (C) and the precipitation area of the PBS. The traps formed with the basic substance (PBS) are guides that serve as a guide for the PBS inside the BSST (E) subsystem and contain the contaminated gases that enter the device of the invention. On the lower surface of the intermediate plate (D) are located the drainage systems (D1) which are elements of rectangular geometric shape and have a fastening carried out by screws located parallel to the guides (D3). The drainage and recirculation systems, designated as (D1), direct the PBS into the BSST subsystem (E) coming from the CTT subsystem (C) and directed by the guides (D3) towards the drainage and recirculation systems (D1) that can be, but are not limited to, drainage channels. On the upper lateral surface of the intermediate plate (D), there are accessories (D5) (see FIG. 9) located in the perforations of the plate (D) for housing the element (D2), this provides the fixing of the accessories (D5-spiracles) on the surface of the lower intermediate plate (D) whose function is the outlet of the gas that has filtered into the BSST subsystem (E). This accessory (D5) is fixed through a mechanical screw system where the gas release is carried out in the compartment (C7) of the CTT subsystem (C).

For the third subsystem called (BSST) (E) (see FIG. 1 to 3), its location can be direct or indirect to the CTT (C) subsystem, i.e. it can be joined or separated/distanced from it as shown in the embodiment illustrated in FIG. 13. Said tank (BSST) (E) has the function of storing a substance PBS (programmed basic substance). The tank (BSST) (E) has a rectangular shape on the outside, and in the inside, it comprises a plurality of plates (E3) in a strategic location (see FIG. 10) where said plates (E3) provide cooling to the liquid substance PBS when descending in a staggered manner. In addition, this element has the function of providing PBS to the centrifugal pump (G) (see FIG. 10) which supplies with PBS the entire recirculation system of the device of the present invention. Additionally, the tank (BSST) (E) has classification mechanisms called "pass-do not pass" which classify the particulate material by weight and dimension (indicated as E1 and E6), separates the particulate material inside (see FIG. 10), and have conical geometry perforated with low-diameter measures such as large particle filters and liquid recirculation mechanisms. The tank (BSST) (E) has on its outside elements and devices that measure pressure, temperature, pH, level and pressure relief valves, among others. On the lower surface of the BSST subsystem (E) (see FIG. 10) there is a drainage system, indicated as (E5.2), with the function of maintaining the cleanliness of the BSST subsystem (E) and a valve (E5.1) for extracting the recirculating PBS for saturation measurement purposes.

An additional subsystem is the PBS substance distribution subsystem for the uniform distribution of the substance coming from the BSST subsystem (E) where the distribution is made by a centrifugal pump (G) that can be fed by renewable solar, wind or electric energy (see FIG. 11). The distribution subsystem of the PBS substance is a system that also includes couplings (H1) connected at one end to the BSST subsystem (E) (see FIG. 11 numeral H1) and at another end to the PMOC (A) subsystem (see FIG. 6 numerals A10 and A11). Both ends are connected to the centrifugal pump (G) (see FIG. 11) which is responsible for the recirculation throughout the device of the invention.

Description of the Route of the Gas with Particulated Material (for Guide See FIG. 12)

There is a contaminating source (see FIGS. 1 and 12, indicated as an exogenous source), direct or indirect. The decontamination device is attached to this source of constant emission of gases with particulate material through the CTT (C) Subsystem, specifically in the element indicated as F2 or F5 (see FIGS. 4 and 5). The gas passes to the first compartment indicated as (C1) in the CTT (C) (see FIG. 12), where the gas increases in pressure due to the decrease in the area of the perforations. Particulate material is directed to the second compartment (C2) where it is re-distributed and directed to the third compartment through an assembly of ducts denominated as mechanical bronchioles (BM) that are anchored to the plate (C2). Once they pass into the compartment (C3.2), they enter a vacuum or trap, created by the PMOC (A) and by a barrier of the PBS which makes the first contact of the PBS substance with the particulate material allowing the precipitation of gas pollutants. The gas is once again led through the ducts or the mechanical bronchioles BM of the cavity (C3.2) to the fourth compartment (C4.1) of the CTT (C) (see FIG. 12). There, it performs an internal recirculation by the so-called mechanical alveoli (AM) (4.1.1) which are rectangular systems with a smaller geometry which force the gas to make an upward and downward recirculation allowing it to impregnate it on the walls of its system. Other ducts or mechanical bronchioles (BM) exit from this compartment (C4.1) towards the fifth compartment (C3.1) (see FIG. 12). These “respiratory” ducts or mechanical bronchioles (BM) lead to the second vacuum place where the impregnation of the PBS with the gas and its particulate material will occur again allowing a greater precipitation of the pollutant from the gas, which is collected again by other mechanical bronchioles (C4.2) or ducts that direct it to the sixth compartment of the CTT subsystem (C) (see FIG. 12). Here the last gas-impregnating recirculation is made in the mechanical alveoli (C4.2.1) housed there in this compartment (C4.2). Finally, the remaining gas, which is minimal due to the above large precipitation and impregnation, goes to the seventh compartment (C7) (see FIG. 12) to be returned to the alveoli of the compartment (C4.2) or to be released by pressure. The gas, that escapes through the holes towards the bottom part due to the density of the liquid, is taken up in the compartment (C7) by the accessory (D5), which is a final unit, and then the gas without particles is released by the duct denominated as (B6) (see FIG. 12).

Description of the PBS Route (Programmable Basic Substance) (Guide—See FIG. 12)

The route of the PBS substance can start in the BSST subsystem (E) where the PBS (programmed basic substance) is deposited, and through the centrifugal pump (G) (see FIG. 12), which is anchored to the system of recirculation ducts (H) (see FIG. 12), is routed to the cylindrical units (A') of the PMOC subsystem (A). To these units, the PBS enters specifically to the four chambers of the two cylindrical units (A') through the adapter (A10) and (A11) (see FIGS. 6 and 12). Through the adapter (A10), the PBS moves upwards towards the upper chamber, increasing the pressure when passing through the plates (A4) and (A3). On reaching the plate (A3) an PBS Euclidean arc geometry is created thanks to the angularity and diameter of the perforations (See FIG. 6E). There, the PBS passes through the middle of the cylindrical plate (A7) where it heads again towards the BSST subsystem (E). Through the adapter (A11), the PBS moves downwards towards the lower chamber of the cylindrical units (A') where there is contact with the plates (A8), (A6) and (A9). Upon reaching the conical plate (A9), a PBS Euclidean arc geometry is also created due to the same angle and diameter of the perforations of this plate (A9) (see FIGS. 6 and 6E). This geometry creates the first void in compartment (C3.2) and (C3.1) of the CTT (C) subsystem. Finally, it descends to the BSST (E) subsystem providing again the filling that allows the recirculation of the PBS without continuous expense, that is, the same amount of initial filling in the BSST (E) subsystem will be the same amount of PBS throughout the recirculation time and cycle of the device according to the present invention. Related the programmed basic substance (PBS), this substance can be an aqueous solution that contains a solute with basic characteristics, such as inorganic bases selected from KOH, NaOH, CaO, $CaCO_3$, or other organic basic substances selected from amines, either primary, secondary or tertiary, ammonia and ammonium hydroxide.

The invention claimed is:

1. A particulate material retaining and atmospheric acid gas neutralizing device, comprising:

a gas inlet for introducing atmospheric gas having particulate material;

a first programmed movement-oriented cylinder (PMOC) having a top end and a bottom end;

a capture and transformation tank (CTT) having a top end and a bottom end;

a first intermediate plate located between the first PMOC and the CTT, said first intermediate plate having a top face and a bottom face;

wherein the bottom end of the first PMOC is connected to the top face of the first intermediate plate;

wherein the top end of the CTT is connected to the bottom face of the first intermediate plate;

wherein the first intermediate plate includes at least one opening adapted to provide the bottom end of the PMOC with access into the CTT;

a basic substance storage tank (BSST) adapted to store a programmed basic substance, wherein said BSST includes a top end and a bottom end;

a second intermediate plate located between the CTT and the BSST, said second intermediate plate having a top face and a bottom face;

wherein the bottom end of the CTT is connected to the top face of the second intermediate plate;

wherein the top end of the BSST is connected to the bottom face of the second intermediate plate;

one or more spiracles or outputs adapted to direct the programmed basic substance from the BSST into the CTT and to facilitate the upward and downward recirculation of the programmed basic substance from the BSST;

a centrifugal pump;

a first basic substance conduction duct connecting the BSST to the centrifugal pump;

a second basic substance conduction duct connecting the centrifugal pump to the first PMOC;

wherein the first and second basic conduction ducts are adapted to guide a flow of the programmed basic substance from the BSST into the first PMOC, via activation of the centrifugal pump;

a gas outlet duct connected to the CTT, wherein said gas outlet duct is adapted to release the particulate material once it has been decontaminated or de-particularized; wherein the first PMOC is adapted to displace the programmed basic substance flowing through the first and second basic substance conduction ducts;

wherein the CTT comprises a plurality of internal compartments adapted to capture and transform one or more gases and particulate material;

wherein the first compartment in the plurality of internal compartments includes one or more nozzles adapted to receive the gases and particulate material; and wherein the plurality of internal compartments comprise one or more mechanical bronchioles adapted to deposit the gases and particulate material in a plurality of traps or mechanical alveoli distributed along the length of the CTT.

2. The particulate material retaining and atmospheric acid gas neutralizing device according to claim 1, wherein the BSST comprises a rectangular shape and its interior comprises a plurality of plates adapted to provide cooling to the programmed basic substance as it moves along the plates;

wherein the BSST further comprises an internal sorting mechanism, which separates the particulate material according to its weight and size; and wherein the BSST comprises equipment adapted to measure pressure, temperature, pH level within the BSST.

3. The particulate material retaining and atmospheric acid gas neutralizing device according to claim 2, wherein the BSST comprises a drainage system to facilitate cleaning of the BSST, and a valve adapted to extract recirculating programmed basic substance.

4. The particulate material retaining and atmospheric acid gas neutralizing device according to claim 1, wherein the one or more spiracles comprise an inner mechanical system containing one or more concentric cylinders forming a maze system that facilitates the upward or downward recirculation of gas coming from the BSST.

5. The particulate material retaining and atmospheric acid gas neutralizing device according to claim 1, wherein the PMOC comprises an outer cylinder having a cylinder upper plate; a cone trunk plate; a homogenizing plate; an upper and lower chamber dividing plate; a flow regulating plate; an inner cylinder or inner wall; a homogenizing plate; a lower cone trunk plate; a programmed basic substance feeding input for the upper chamber and a programmed basic substance feeding input for the lower chamber; and a downward plate.

6. The particulate material retaining and atmospheric acid gas neutralizing device according to claim 5, wherein the PMOC comprises spaces or voids on the bottom end of the PMOC configured to facilitate the continuous flow of programmed basic substance through one or more orifices in the cone trunk plate which converge with one or more orifices on the lower cone trunk plate.

7. The particulate material retaining and atmospheric acid gas neutralizing device according to claim 1, wherein the programmed basic substance is an aqueous substance containing a solute with basic characteristics selected from the group consisting of KOH, NaOH, CaO, $CaCO_3$, amines, ammonia and ammonium hydroxide.

8. The particulate material retaining and atmospheric acid gas neutralizing device according to claim 1, wherein the first PMOC includes a plurality of pierced or perforated plates within the first PMOC adapted to assist in the displacement of the basic substances.

9. The particulate material retaining and atmospheric acid gas neutralizing device according to claim 1, wherein the first PMOC comprises an external cylinder, an inner cylinder concentric to the outer cylinder, a dividing plate connecting the external cylinder to the internal cylinder, wherein said dividing plate is adapted to divide the PMOC into an ascending chamber and descending chamber, and wherein each of the ascending chamber and the descending chamber is adapted to connect, via a corresponding inlet, to the second basic substance conduction duct.

10. The particulate material retaining and atmospheric acid gas neutralizing device according to claim 1, further comprising a second PMOC.

11. The particulate material retaining and atmospheric acid gas neutralizing device according to claim 10, wherein the second PMOC includes a plurality of pierced or perforated plates within the second PMOC adapted to assist in the displacement of the basic substances.

12. The particulate material retaining and atmospheric acid gas neutralizing device according to claim 10, wherein the second PMOC comprises an external cylinder, an inner cylinder concentric to the outer cylinder, a dividing plate connecting the external cylinder to the internal cylinder, wherein said dividing plate is adapted to divide the PMOC into an ascending chamber and descending chamber, and wherein each of the ascending chamber and the descending chamber is adapted to connect, via a corresponding inlet, to the second basic substance conduction duct.

* * * * *